(12) United States Patent
Mikawa et al.

(10) Patent No.: US 9,541,818 B2
(45) Date of Patent: Jan. 10, 2017

(54) COOLING DEVICE, COOLING STRUCTURE, IMAGE PROJECTION DEVICE, AND ELECTRONIC DEVICE

(71) Applicants: Akihisa Mikawa, Kanagawa (JP); Tetsuya Fujioka, Kanagawa (JP); Hideo Kanai, Tokyo (JP); Yasunari Mikutsu, Tokyo (JP); Satoshi Tsuchiya, Kanagawa (JP); Yukimi Nishi, Tokyo (JP); Jun Mashimo, Tokyo (JP)

(72) Inventors: Akihisa Mikawa, Kanagawa (JP); Tetsuya Fujioka, Kanagawa (JP); Hideo Kanai, Tokyo (JP); Yasunari Mikutsu, Tokyo (JP); Satoshi Tsuchiya, Kanagawa (JP); Yukimi Nishi, Tokyo (JP); Jun Mashimo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/831,982

(22) Filed: Aug. 21, 2015

(65) Prior Publication Data

US 2016/0062219 A1    Mar. 3, 2016

(30) Foreign Application Priority Data

Aug. 26, 2014 (JP) ................. 2014-171694

(51) Int. Cl.
*G03B 21/16* (2006.01)
*G02B 6/42* (2006.01)

(52) U.S. Cl.
CPC ............. *G03B 21/16* (2013.01); *G02B 6/4269* (2013.01)

(58) Field of Classification Search
CPC ....... G03B 21/14; G03B 21/16; G02B 6/4201; G02B 6/4269; G06F 2200/201; G06F 2200/203

See application file for complete search history.

(56) References Cited

U.S. PATENT DOCUMENTS

| 2004/0179335 | A1* | 9/2004 | Chen ................... H01L 23/3672 361/690 |
| 2013/0077253 | A1* | 3/2013 | Macall ................. G02B 6/4261 361/715 |
| 2014/0375966 | A1 | 12/2014 | Mikawa et al. |
| 2014/0375967 | A1 | 12/2014 | Mikawa et al. |

FOREIGN PATENT DOCUMENTS

JP          4144037         9/2008

* cited by examiner

*Primary Examiner* — Sultan Chowdhury
(74) *Attorney, Agent, or Firm* — IPUSA, PLLC

(57) ABSTRACT

Disclosed is a cooling device including a blower including an exhaust port; and a radiator including heat radiation fins, wherein the heat radiation fins include a first heat dissipation area and a second heat dissipation area, wherein a first surface area of the heat radiation fins disposed in the first heat dissipation area is greater than that of the heat radiation fins disposed in the second heat dissipation area, wherein the exhaust port of the air blowing part includes first and second exhaust areas for exhausting cooling air, wherein an amount of the cooling air exhausted from the second exhaust area is greater than that of the first exhaust area, and wherein the first heat dissipation area is disposed in the first exhaust area, and the second heat dissipation area is disposed in the second exhaust area.

10 Claims, 24 Drawing Sheets

COOLING DEVICE, COOLING STRUCTURE, IMAGE PROJECTION DEVICE, AND ELECTRONIC DEVICE

BACKGROUND OF THE INVENTION

1. Field of the Invention

The present invention relates to a cooling device, a cooling structure, an image projection device, and an electronic device.

2. Description of the Related Art

As a cooling device for cooling a heat source, the following configuration has already been known. Namely, a heat dissipation area of the heat source is enlarged by attaching a radiator having a plurality of heat radiation fins to the heat source, and cooling is achieved by directly blowing air (cooling air) that is exhausted from a fan on the heat radiation fins.

As an example of such a cooling device, a cooling device having the following configuration has been disclosed (cf. Patent Document 1 (Japanese Patent No. 4144037), for example). Namely, a fan has a plurality of exhaust ports, and each exhaust port includes a radiator having heat radiation fins. The radiator having the heat radiation fins is disposed inside the corresponding exhaust port. For each of the radiator, lengths and spacing of the heat radiation fins can be varied, so that lengths of the fins and spacing of the fins are adjusted to a wind speed distribution of cooling air that is exhausted from the fan.

SUMMARY OF THE INVENTION

In the cooling device according to above-described Patent Document 1, the heat radiation fins are designed such that, in the wind speed distribution of the cooling air that is exhausted from the fan, a surface area of the radiator is enlarged at a position where the wind speed is high, and the surface area of the radiator is reduced in proportion to a reduction rate of the wind speed at a position where the wind speed is reduced. Consequently, the wind speed (or a wind volume) of the cooling air that passes through each of the fins becomes almost the same, so that each of the fins have substantially the same cooling capability. Note that the cooling air that is exhausted from the fan has a characteristic such that the wind speed tends to be reduced, as the distance from the fan becomes greater.

The cooling device according to Patent Document 1 can send a sufficient amount of the cooling air to a radiator that is disposed at a position that is close to the fan. However, the cooling device according to Patent Document 1 may not send a sufficient amount of the cooling air to another object to be cooled that is far from the radiator and that is disposed at a downstream position from the radiator. Thus, in the cooling device according to Patent Document 1, it is difficult to simultaneously cool, by the single fan, another object to be cooled that includes a radiator.

There is a need for a cooling device that is capable of sending a sufficient amount of cooling air to an object to be cooled that is disposed at a downstream position from a radiator.

According to an aspect of the present invention, there is provided a cooling device including an air blowing part that includes an exhaust port; and a radiator that includes a plurality of heat radiation fins, wherein the heat radiation fins of the radiator include at least a first heat dissipation area and a second heat dissipation area, wherein a first surface area of a first set of the heat radiation fins that are disposed in the first heat dissipation area is greater than a second surface area of a second set of the heat radiation fins that are disposed in the second heat dissipation area, wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, and wherein the first heat dissipation area including the first set of the heat radiation fins is disposed in the first exhaust area, and the second heat dissipation area including the second set of the heat radiation fins is disposed in the second exhaust area.

According to another aspect of the present invention, there is provided a cooling structure including a radiator that includes a plurality of heat radiation fins, wherein the radiator is configured to dissipate heat from a first object to be cooled by contacting the first object to be cooled; and an air blowing part for blowing cooling air to the radiator, wherein the air blowing part includes an exhaust port, wherein the heat radiation fins of the radiator include at least a first heat dissipation area and a second heat dissipation area, wherein a first surface area of a first set of the heat radiation fins that are disposed in the first heat dissipation area is greater than a second surface area of a second set of the heat radiation fins that are disposed in the second heat dissipation area, wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, wherein the first heat dissipation area including the first set of the heat radiation fins is disposed in the first exhaust area, and the second heat dissipation area including the second set of the heat radiation fins is disposed in the second exhaust area, and wherein a second object to be cooled that is different from the first object to be cooled is disposed at a downstream side of the second heat dissipation area, and the second cooling air that passes through the second exhaust area is sent to the second object to be cooled.

According to another aspect of the present invention, there is provided an image projection device including a cooling structure; an image display element for displaying an image; and a projection optical unit for projecting the image that is displayed on the image display element. The cooling structure includes a radiator that includes a plurality of heat radiation fins, wherein the radiator is configured to dissipate heat from the image display element by contacting the image display element; and an air blowing part for blowing cooling air to the radiator, wherein the air blowing part includes an exhaust port, wherein the heat radiation fins of the radiator include at least a first heat dissipation area and a second heat dissipation area, wherein a first surface area of a first set of the heat radiation fins that are disposed in the first heat dissipation area is greater than a second surface area of a second set of the heat radiation fins that are disposed in the second heat dissipation area, wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, wherein the first heat dissipation area including the first set of the heat radiation fins is disposed in the first exhaust area, and the second heat dissipation area including the second set of the heat radiation fins is disposed in the second exhaust area, and wherein the projection optical unit is disposed at a downstream side of the second heat dissipation area, and the second cooling air that passes through the second exhaust area is sent to the projection optical unit.

According to another aspect of the present invention, there is provided an electronic device including an object to be cooled; and a cooling device for cooling the object to be cooled. The cooling device includes an air blowing part that includes an exhaust port; and a radiator that includes a plurality of heat radiation fins, wherein the heat radiation fins of the radiator include at least a first heat dissipation area and a second heat dissipation area, wherein a first surface area of a first set of the heat radiation fins that are disposed in the first heat dissipation area is greater than a second surface area of a second set of the heat radiation fins that are disposed in the second heat dissipation area, wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, and wherein the first heat dissipation area including the first set of the heat radiation fins is disposed in the first exhaust area, and the second heat dissipation area including the second set of the heat radiation fins is disposed in the second exhaust area.

According to an embodiment of the present invention, there can be provided a cooling device that is capable of sending a sufficient amount of cooling air to an object to be cooled that is disposed at a downstream position from a radiator.

Other objects, features and advantages of the present invention will become more apparent from the following detailed description when read in conjunction with the accompanying drawings.

DETAILED DESCRIPTION OF THE PREFERRED EMBODIMENTS

Figure 1:
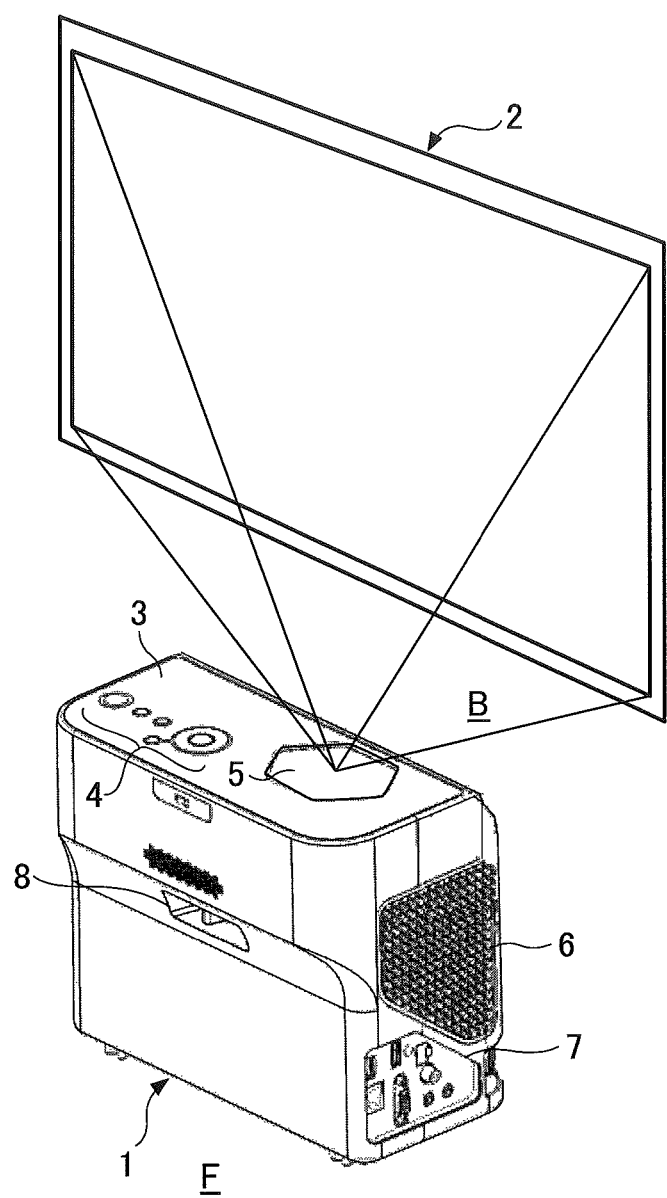
FIG. 1 is a perspective view showing an example of a situation in which an image projection device according to an embodiment of the present invention is used.

Next, there are explained a cooling device, a cooling structure, an image projection device, and an electronic device according to embodiments of the present invention. In the figures, the same reference numerals may be attached to the same portions or the corresponding portions, and their duplicate explanations may be appropriately simplified or omitted. The figures are not intended to show relative ratios among members or components. Thus, specific sizes can be determined by a person ordinarily skilled in the art, in light of the following non-limiting embodiments.

The cooling device according to the embodiments of the present invention can preferably be installed in the image projection device. Thus, in the following, first an overall configuration of the image projection device is explained, and subsequently configurations of the cooling device and the cooling structures are specifically explained.

<Image Projection Device>

Figures 2A, 2B:
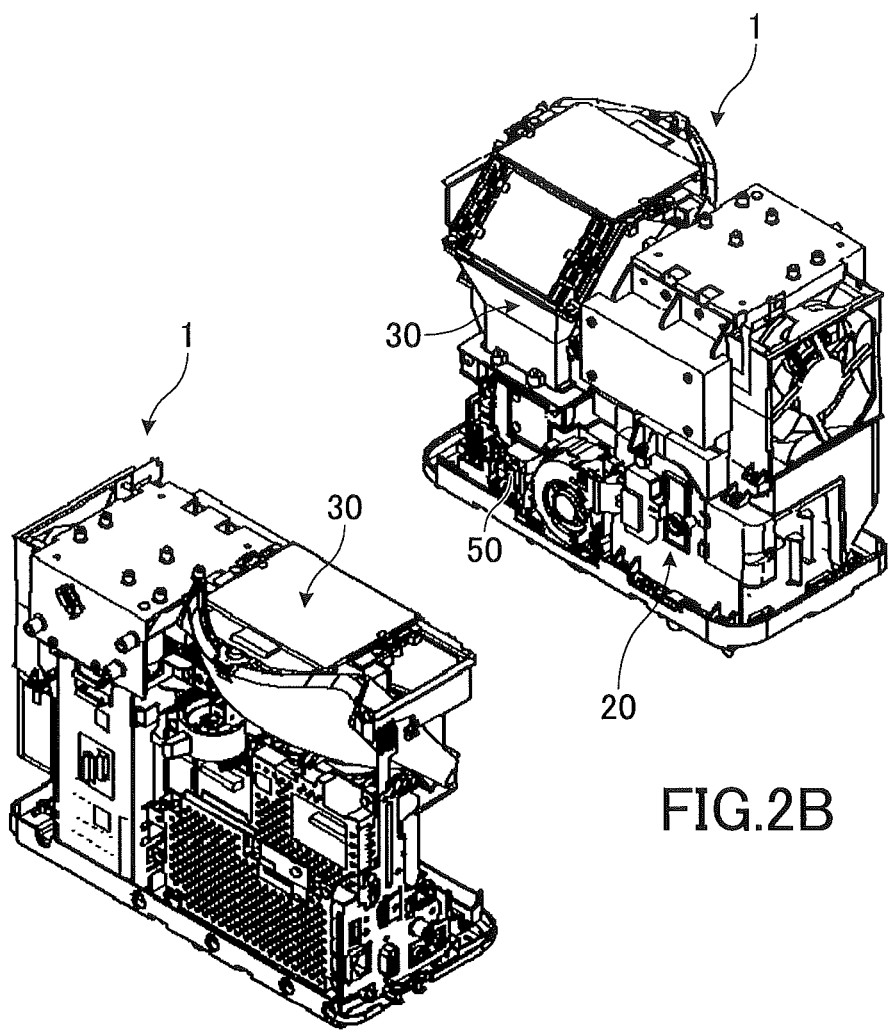
FIG. 2A is a perspective view showing an internal structure of the image projection device that is viewed from a front side of FIG. 1.
FIG. 2B is a perspective view showing the internal structure of the image projection device that is viewed from a rear side of FIG. 1.

FIGS. 1, 2A, and 2B show an example of a schematic configuration of the image projection device 1 according to an embodiment of the present invention. FIG. 1 is a perspective view showing the example of the schematic configuration of the image projection device 1 during projection. FIGS. 2A and 2B are diagrams showing an example of an internal configuration of the image projection device 1. Here, a state is shown in FIGS. 2A and 2B in which an external cover 3 is removed. FIG. 2A is a perspective view such that the image projection device 1 is viewed from a position at a front side F of FIG. 1. FIG. 2B is a perspective view such that the image projection device 1 is viewed from a position at a rear side B of FIG. 1.

The image projection device 1 is a device that is for generating an image based on image data that is input from a personal computer, a camcorder, or the like, and for displaying the image by projecting the image on a screen 2 that is a surface to be projected. The depicted image projection device 1 is a compact and lightweight front-type projector that utilizes a Digital Micro-mirror Device (DMD). The image projection device 1 is a vertical installation type image projector. However, the embodiment is not limited to this.

The image projection device 1 is a device such that its internal structure is to be installed inside the external cover 3. An operation unit 4 and a projection port 5 are provided on an upper surface portion of the external cover 3. An inlet port 6 and a connector area 7 are provided on a right side surface of the external cover 3. Another exhaust port is provided on a left side surface of the external cover 3. A focus adjustment unit 8 and the like are provided on a front portion of the external cover 3.

As shown in FIG. 2, the image projection device 1 can be roughly divided into a light source device 20, an optical engine 30, and a cooling device 50, as basic configurations. Namely, the image projection device 1 includes the light source device 20, the optical engine 30, and the cooling device 50. Additionally, the image projection device 1 may include components that are the same as components that are installed in a normal projector. Here, detailed description of the components is omitted.

Figure 3:
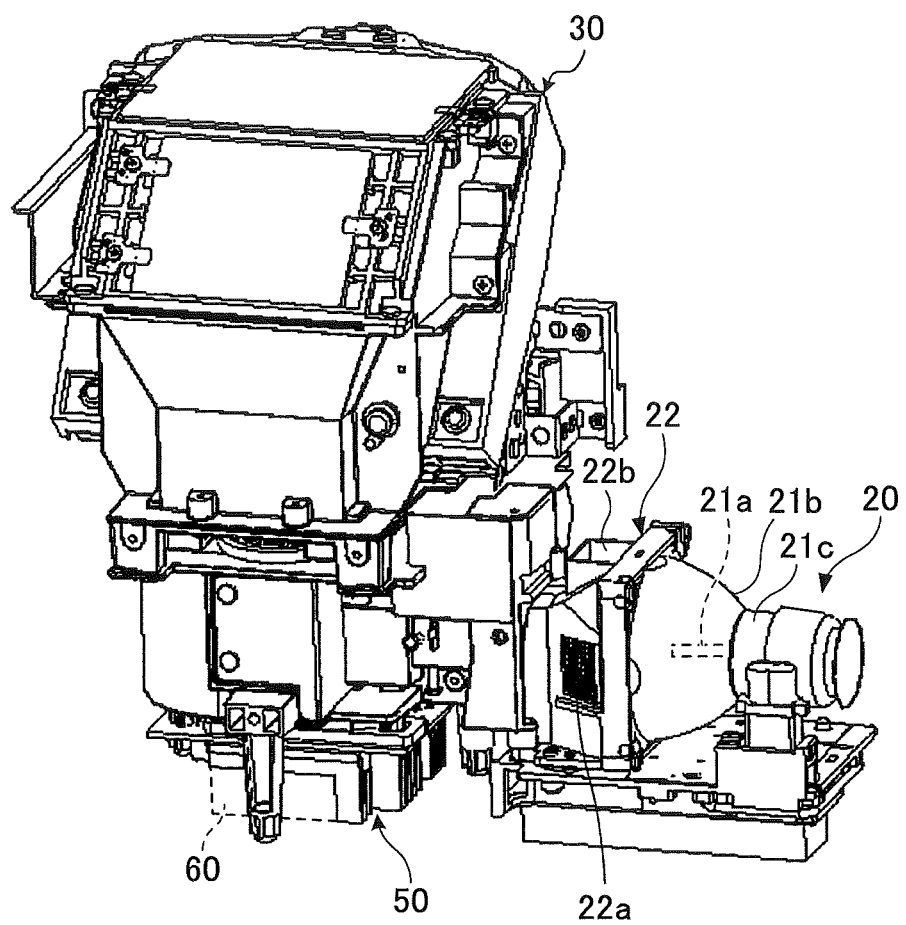
FIG. 3 is a perspective view showing a relationship between an optical engine and a light source device.
Figure 4:
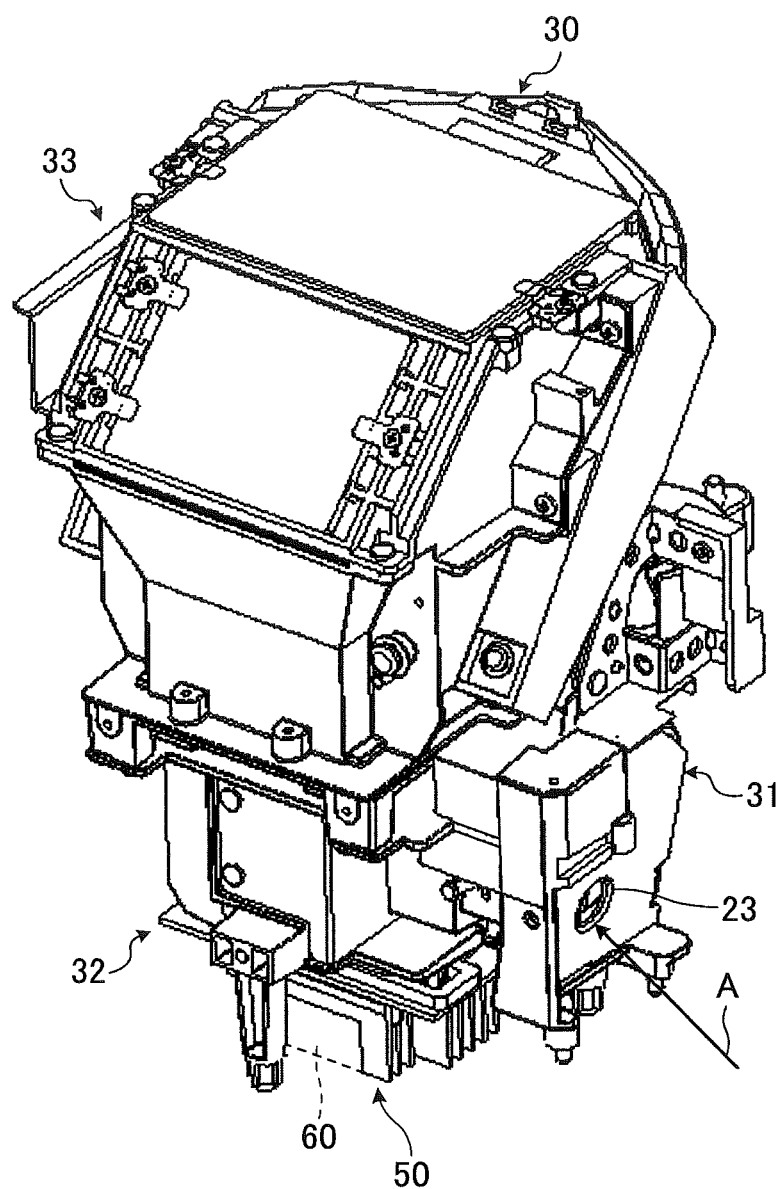
FIG. 4 is a perspective view showing a schematic configuration of the optical engine.

Next, the light source device 20, the optical engine 30, and the cooling device 50 are explained by referring to the figures. FIG. 3 shows a situation in which the light source device 20, the optical engine 30, and the cooling device 50 are taken out from the image projection device 1. FIG. 4 shows a situation in which only the optical engine 30 and the cooling device 50 are taken out from the image projection device 1.

The cooling device 50 corresponds to one of features of the embodiment of the present invention. Thus, the cooling device 50 is explained in detail below. The cooling device 50 has a configuration such that a sirocco fan 60 (which corresponds to an air blowing part) that is indicated by the dashed line is combined therewith. The light source device 20 can supply light (white light) that is required for projecting an image to the optical engine 30 by controlling a high-pressure mercury lamp, for example.

The light source device 20 may include a light source 21a; a reflector 21b; a sealing portion 21c, and so forth. The light source 21a can be a halogen lamp, a metal halide lamp, or a high-pressure mercury lamp, for example.

Further, the light source device 20 may include a light source housing 22 for holding, for example, an upper edge portion of the reflector 21b at a light emitting side of the light source 21a. The light source housing 22 may be fastened to the light source device 20 with one or more screws. An emission window 23 (cf. FIG. 4) is provided on a surface of the light source housing 22 that is at a side that is opposite to a side at which the light source 21a is disposed. Light emitted from the light source 21a is condensed to the emission window 23 by the reflector 21b that is held by the light source housing 22, and the light is transmitted from the emission window 23.

Further, a light source inlet port 22a and a light source exhaust port 22b may be provided on corresponding sides of the light source housing 22. Air for cooling the light source 21a can be flown in through the light source inlet port 22a. The air that is heated by the heat of the light source 21a can be exhausted through the light source exhaust port 22b.

The optical engine 30 can execute control such that input image data is processed, and the resultant image is projected by using light that is supplied from the light source device 20. FIG. 4 is a perspective view showing an example of a detailed configuration of the optical engine 30. The optical engine 30 may include an illumination optical unit 31; a projection optical unit 33; and an image processing unit 32. First, the white light from the above-described light source device 20 is irradiated onto the illumination optical unit 31. The illumination optical unit 31 can spectrally decompose the white light from the light source device 20 into a red (R) component, a green (G) component, and a blue (B) component, and the illumination optical unit 31 can guide these decomposed light components to the image processing unit 32. The image processing unit 32 can generate an image that is to be projected from the input image data by forming the image in accordance with a modulation signal. The projection optical unit 33 can enlarge the image that is generated by the image processing unit 32, and the projection optical unit 33 can project the enlarged image to a surface that is to be irradiated.

Figure 5:
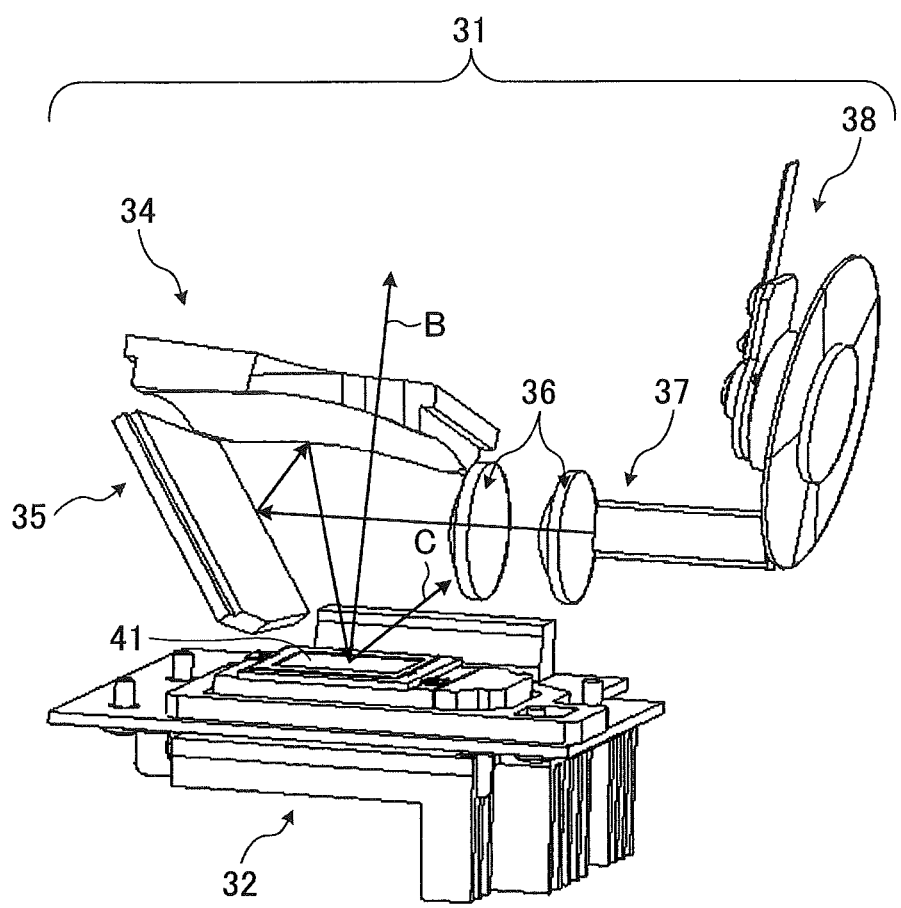
FIG. 5 is a diagram illustrating schematic configurations of an illumination optical unit and an image processing unit, and an optical path.

FIG. 5 is a diagram showing an arrangement of the illumination optical system 31 and the image processing unit 32, and optical paths. The illumination optical unit 31 may include a color wheel 38; an optical tunnel 37; relay lenses 36; a cylinder mirror 35; and a concave mirror 34. The color wheel 38 can convert, by using a color filter having a disk-like shape, the white light that is emitted from the light source device 20 into specific light such that a color of the specific light is cyclically switched at every unit time in an order of red (R), green (G), and blue (B). The color wheel 38 can transmit the specific light.

The optical tunnel 37 can be formed to have a tube-like shape by gluing glass plates together. The optical tunnel 37 can guide the light from the color wheel 37. The relay lenses 36 may be formed of a combination of two lenses. While correcting axial chromatic aberration of the light that is emitted from the optical tunnel 37, the relay lenses 36 can condense the light.

The cylinder mirror 35 and the concave mirror 34 can reflect the light that is transmitted from the relay lenses 36. The reflected light enters the image processing unit 32. The image processing unit 32 includes a DMD element 41. The DMD element 41 has a substantially rectangular mirror surface that is formed of a plurality of micromirros. The DMD element 41 can process and reflect projected light by driving the micromirrors in a time-division manner based on video data or image data, so that a desired image can be generated. Then, in the image processing unit 32, based on video data that is time-divided by the DMD element 41 (a first object to be cooled), the light that is processed by the plurality of micromirrors is reflected in a direction toward a projection lens 51, which is indicated by the arrow B in the figure, and the light to be discarded is reflected in a direction toward an OFF light plate 53, which is indicated by the arrow C in the figure.

Figure 6:
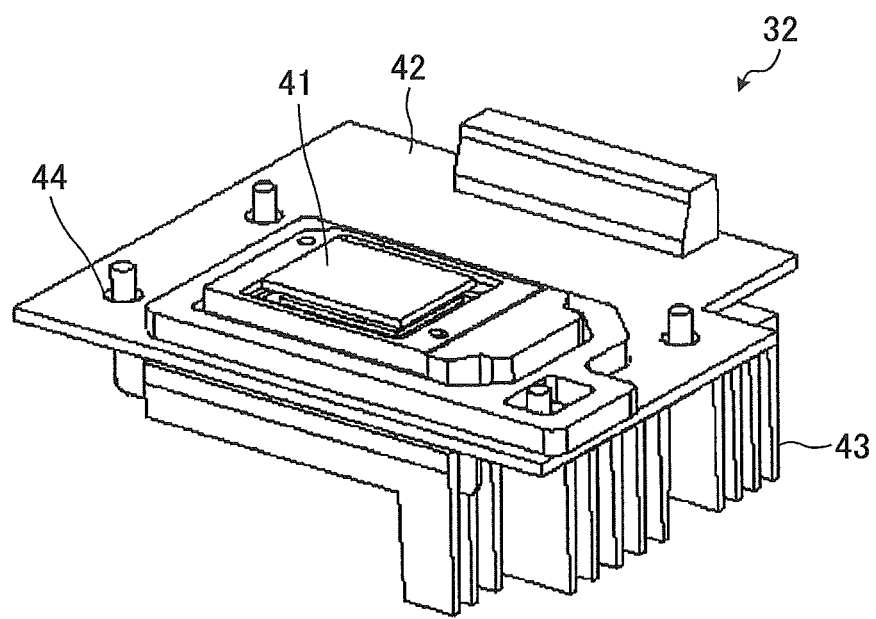
FIG. 6 is a perspective view showing a schematic configuration of the image processing unit.

FIG. 6 is a perspective view showing an example of a configuration of the image processing unit 32. The image processing unit 32 may include the DMD element 41; a DMD printed circuit board 42 for controlling the DMD element 41; a heat sink 43 for cooling the DMD element 41; and a fixing plate 44 for pressing the heat sink 43 toward the DMD element 41. In the embodiment, the heat sink 43 may correspond to a radiator. The heat sink 43 can dissipate heat of the DMD element 41 by contacting the DMD element 41 that is the first object to be cooled.

Figure 7:
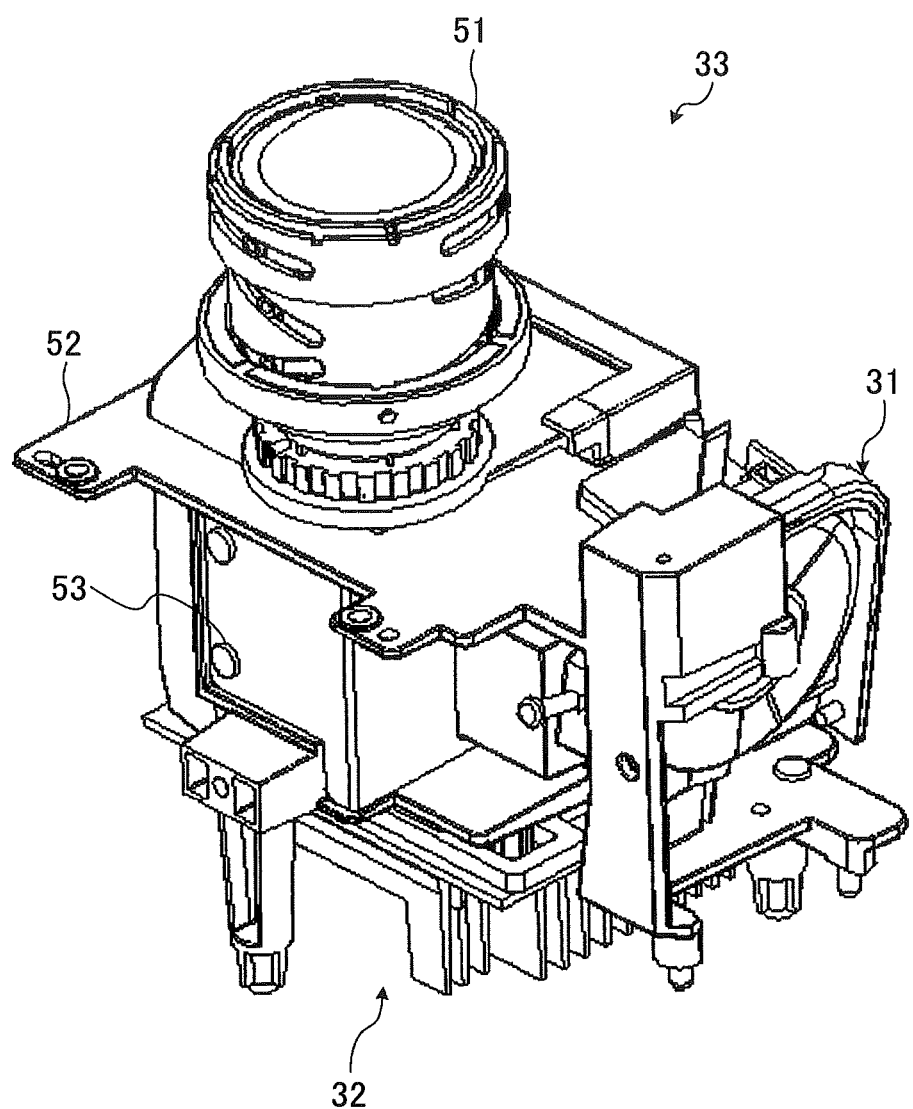
FIG. 7 is a perspective view showing an example of a part of a configuration of a projection optical unit.
Figure 8:
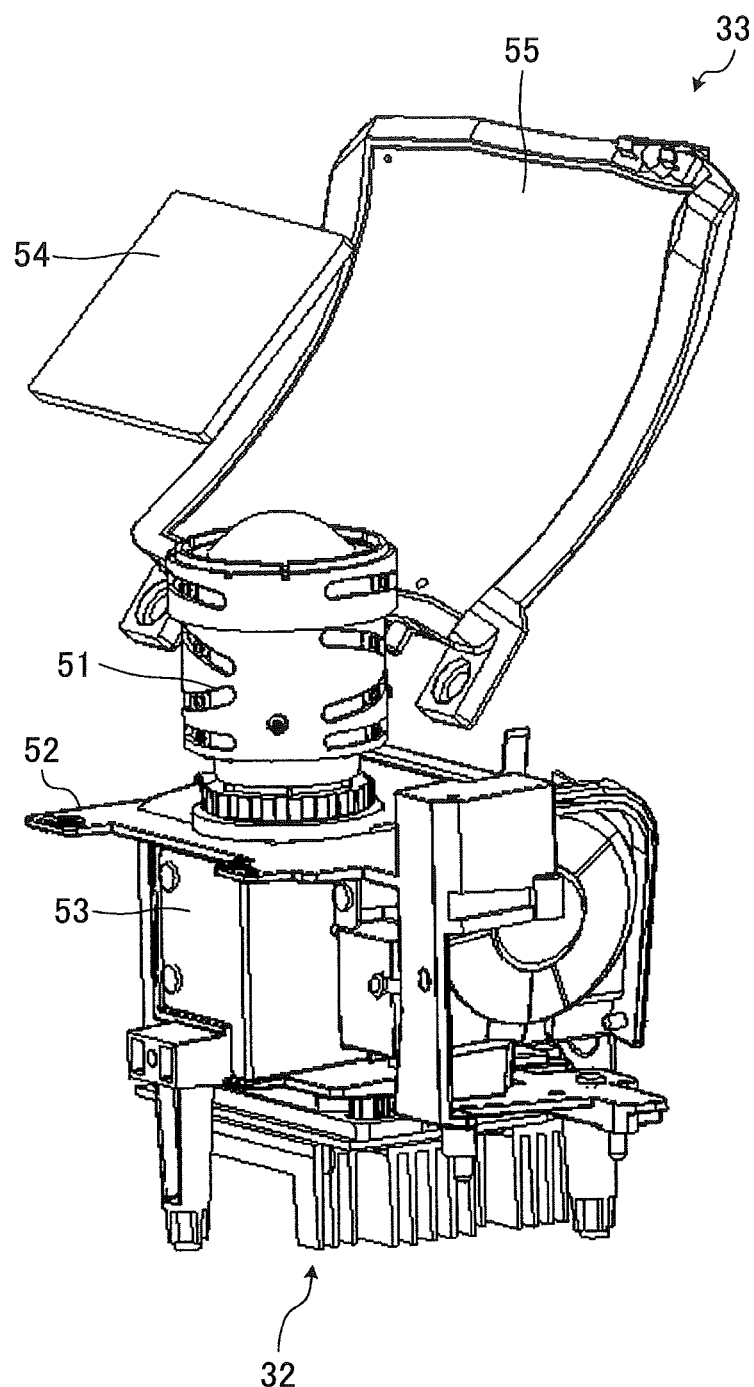
FIG. 8 is a perspective view showing an example of the configuration of the projection optical system.

FIGS. 7 and 8 are perspective views showing an example of a configuration of the projection optical unit 33. The light that passes through the image processing unit 32 is reflected toward the projection lens 51 of FIG. 7, and the light to be discarded is reflected toward the OFF light plate 53.

Figure 9:
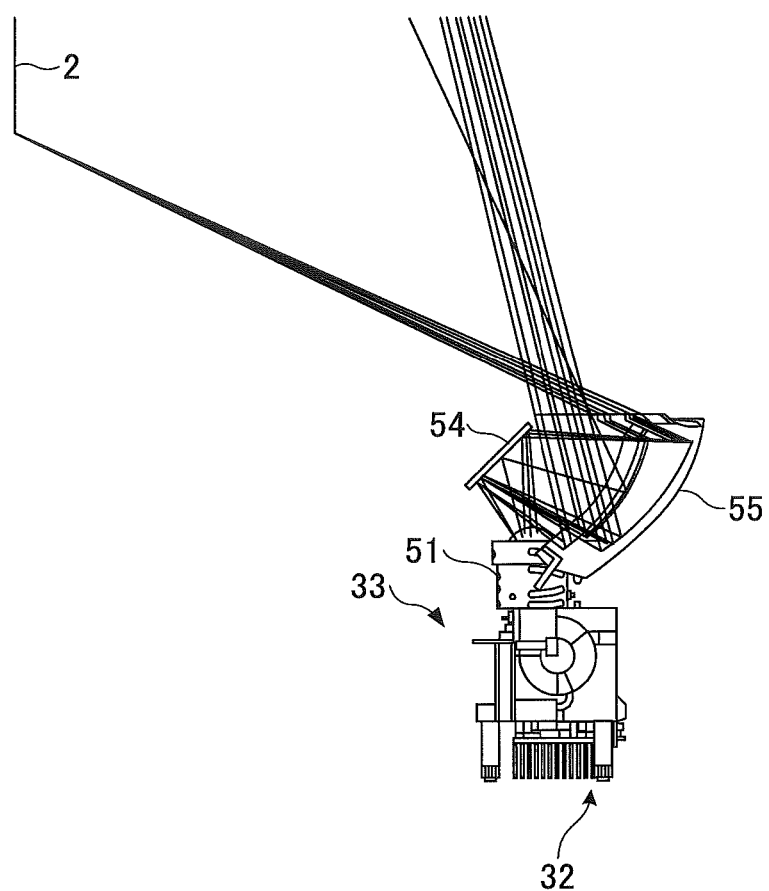
FIG. 9 is a diagram illustrating an example of an optical path of the projection optical system.

FIG. 9 is a side view illustrating optical paths in the projection optical unit 33. An optical path of the image light that is enlarged by passing through the projection lens 51 is folded by a folding mirror 54, and an enlarged image is displayed on the screen 2 by a free-curved surface mirror 55. With the above-described configuration, in the image projection device 1, the optical engine 30 can be arranged in vicinity of the above-described screen 2. Thus, the image projection device 1 can be designed to be a vertical type whose optical axis is in a vertical direction, and an installation area of the image projection device 1 can be made small.

First Embodiment

Cooling Device

Figure 10:
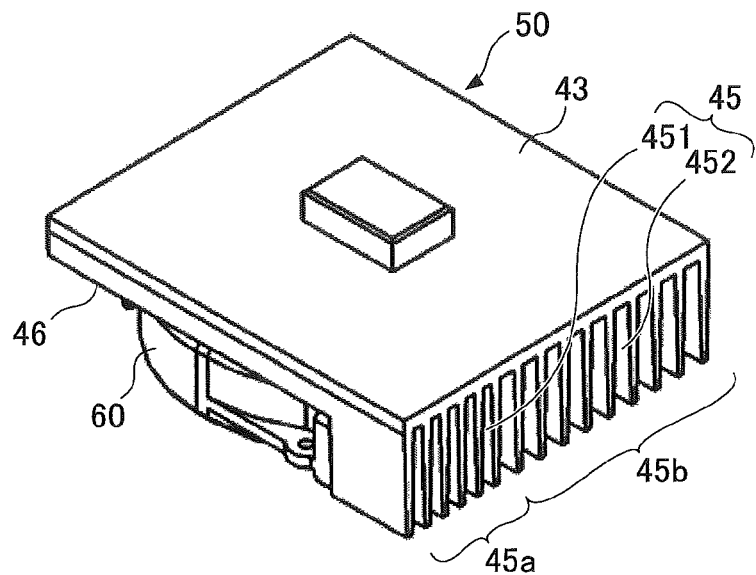
FIG. 10 is a perspective view showing an example of a configuration of a cooling device according to a first embodiment.

Next, the cooling device 50 according to a first embodiment is explained by referring to the figures. FIG. 10 is a perspective view showing an example of an overall configuration of the cooling device 50. The cooling device 50 may be formed by combining the heat sink 43 (which corresponds to the radiator) that is shown in FIG. 6 and the sirocco fan 60 that is provided inside the cooling device 50 (a bottom side of the device).

For a case in which the heat sink 43 is installed in the image projection device 1, for example, a cooling structure can be achieved that is for cooling two objects to be cooled that are the DMD element 41 (the first object to be cooled) of the image processing unit 32 and the light source device 20 (the second object to be cooled) that is disposed at a position downstream from the heat sink 43.

In the above-described heat sink 43, a plurality of fins 45 (which corresponds to the heat radiation fins) that extend in the vertical direction are arranged in parallel. The heat sink 43 has a configuration for cooling an object to be cooled by directly blowing cooling air from the sirocco fan 60 to the fins 45.

Note that the heat sink 43 has a configuration such that the depicted fins 45 are arranged in parallel in a direction that is perpendicular to a width direction of the heat sink 43 while evenly spaced apart by a predetermined pitch, so that a gap between adjacent fins forms a flow channel of cooling air.

The fins 45 include a first heat dissipation area 45a having a large surface area, and a second heat dissipation area 45b having a small surface area. Hereinafter, a set of the fins 45 that is arranged in the first heat dissipation area 45a is denoted by 451, and the other set of the fins 45 that is arranged in the second heat dissipation area 45b is denoted by 452.

In the embodiment, the surface area of the fins 451 in the first heat dissipation area 45a and the surface area of the fins 452 in the second heat dissipation area 45b are made different by differentiating a fin pitch of the fins 451 that are disposed in the first heat dissipation area 45a and a fin pitch of the fins 452 that are disposed in the second heat dissipation area 45b. These fin pitches and the first and second heat dissipation areas 45a and 45b are described below.

In the embodiment, the cooling device 50 is formed by integrally connecting the sirocco fan 60 and the heat sink 43 by providing a step portion 46 at a part of the heat sink 43 and accommodating the sirocco fan 60 in the step portion 46. Thus, an external shape of the cooling device 50 is a substantially rectangular shape. Consequently, necessity to alter the design of other peripheral components can be minimized.

Further, edges of a top surface of the heat sink 43 are arranged linearly, and the shape of the top surface of the depicted heat sink 43 is formed to be a rectangular shape. The corner portions may be rounded. In the depicted example, especially, the right side edge of the top surface of the heat sink 43 is precisely processed. The right side edge is an edge that is to be connected to another peripheral device (a peripheral component), such as the light source device 20. If a step or the like were formed at this edge, a design alteration would be required at a component for connecting to the peripheral device. Thus, by linearly arranging the edge of the top surface of the heat sink 43 that is to be connected to another peripheral device, a design alteration of the peripheral device can be avoided.

The sirocco fan 60 corresponds to an air blowing part that is for taking in and sending external air to the heat sink 43. The sirocco fan 60 has a configuration in which a cylinder including a plurality of small forward-facing blades and an air rectifier are combined. For the sirocco fan 60, a fan having fan static efficiency of approximately 60% can be used.

Figure 11:
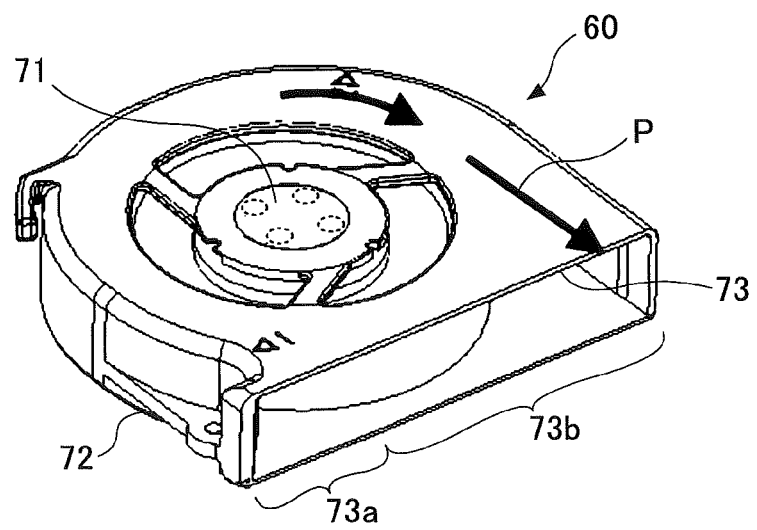
FIG. 11 is a perspective view showing an example of a configuration of a sirocco fan.

Further, as shown in FIG. 11, the sirocco fan 60 may include a first inlet port 71, a second inlet port 72, and an exhaust port 73. The second inlet port 72 is provided on a side that is opposite to the side of the first inlet port 71. Thus, the sirocco fan 60 can suction air from both sides. In other words, in the embodiment, the first inlet port 71 is provided on the side of the upper surface of the sirocco fan 60, and the second inlet port 72 is provided on the side of the bottom surface of the sirocco fan 60. In the configuration according to the embodiment, the sirocco fan 60 is used such that the exhaust port 73 has a wide width, namely, the width of the exhaust port 73 is greater than the thickness of the exhaust port 73. This is for enhancing cooling efficiency.

For the sirocco fan 60 in which the exhaust port 73 has a wide width, an area for exhausting cooling air can be made large. Thus, a contact area between the cooling air and the heat sink 43 can be enlarged. Further, by enlarging the contact area between the cooling air and the heat sink 43, the cooling efficiency can be enhanced.

In the sirocco fan 60, a high-speed air current tends to be concentrated on a side of an edge that is indicated by the arrow P because of the configuration that the generated cooling air is guided toward the exhaust port 73 by a current rotating clockwise (rotating in the right direction). Thus, the wind speed of the exhausted cooling air is not uniform in the width direction (the longitudinal direction) of the exhaust port 73, so that there are a portion where wind speed is high and a portion where wind speed is low. In the depicted example, the wind speed is high at the right portion, and the wind speed is low at the other portion. Consequently, the wide exhaust portion 73 can be divided into a first exhaust area 73a and a second exhaust area 73b. In the first exhaust area 73a, a flow rate is small and a first predetermined amount of cooling air flows. In the second exhaust area 73b, a second amount of air flows that is greater than the first amount.

Note that, in the above-described configuration, the position of the first exhaust area 73a corresponds to the position of the first heat dissipation area 45a of the fins 45, and the position of the second exhaust area 73b corresponds to the position of the second heat dissipation area 45b of the fins 45.

Figure 12:
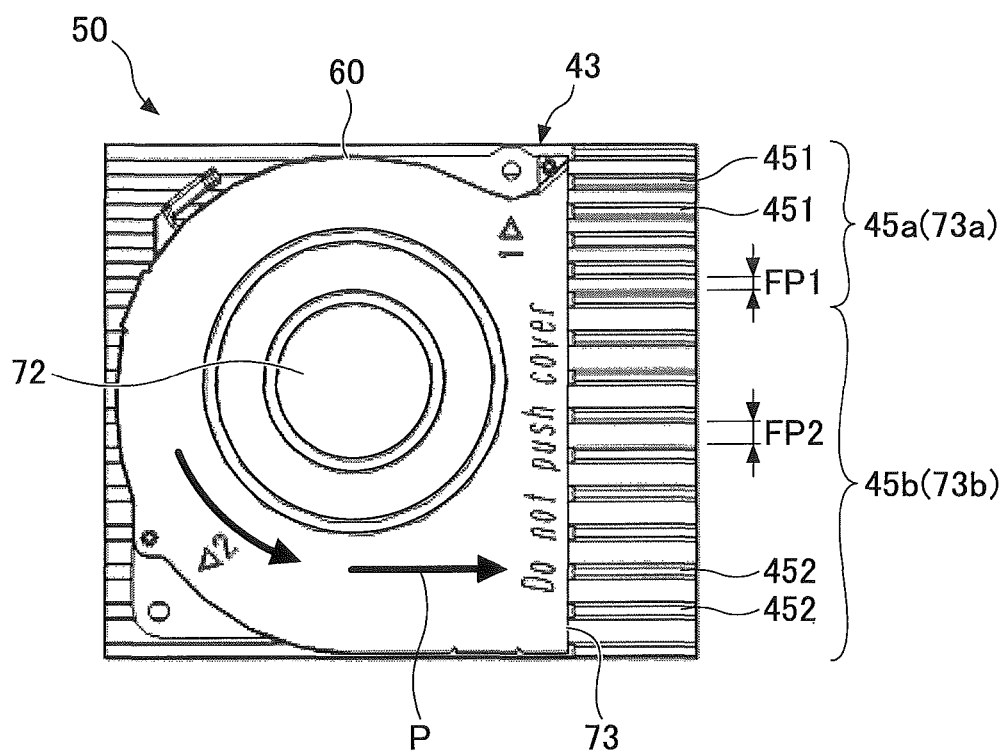
FIG. 12 is a bottom view of the cooling device that is shown in FIG. 10.

FIG. 12 is a diagram showing the cooling device 50 that includes the sirocco fan 60, which is viewed from the bottom side. As shown in FIG. 12, the fins 451 of the first heat dissipation area 45a are arranged in the first exhaust area 73a. The fins 452 of the second heat dissipation area 45b are arranged in the second exhaust area 73b. As depicted, the fins 451 and the fins 452 are disposed at positions that are outside the exhaust port 73 and that face the exhaust port 73.

For the fins 452 that are disposed at the second exhaust area 73b where the flow amount is large, the surface area of the fins 452 is reduced by enlarging (by making coarse) the fin pitch FP2. For the fins 451 that are disposed at the first exhaust area 73a where a small flow amount of the cooling air is to be passes through, the fin pitch FP1 is made small. Here, the fin pitch can be defined to be a distance between adjacent fins. Note that, in the depicted example, the relationship between the fin pitch FP1 and the fin pitch FP2 can preferably be FP1=FP2×½.

In the second exhaust area 73b where a large flow amount of the cooling air is to be passed through, ventilation resistance is reduced by enlarging the fin pitch FP2 of the fins 452, and the cooling air that passes through the second heat dissipation area 45b can be used for cooling an object to be cooled (a second object to be cooled) that is disposed at a downstream side.

In the first exhaust area 73a where a small flow amount of the cooling air is to be passed through, the surface area is enlarged by reducing the pitch of the fins 451. In this manner, the heat sink 43 can be cooled on which the DMD element 41 (a first object to be cooled) is to be fastened. For the DMD element 41, strict usage temperature limits are to be applied. In other words, by the fins 451 in the first heat dissipation area 45a in which the fin pitch is small, the heat sink 43 is to be cooled; and by the fins 452 in the second heat dissipation area 45b in which the fin pitch is large, an object to be cooled at a downstream side can be cooled.

Next, there are explained reasons for the configuration such that the second head dissipation area 45b that includes the fins 452 having the large pitch is disposed at the second exhaust area 73b where a large flow amount of the cooling air is to be passed through, and that the cooling air that is exhausted from the second heat dissipation area 45b is to be sent to an object to be cooled at a downstream side.

The first reason is to efficiently cool the heat sink 43 and the other object to be cooled (the light source device 20) by sending sufficient cooling air not only to the heat sink 43, but also to the other object to be cooled (the light source device 20) that is disposed at a position downstream of the heat sink 43.

Hereinafter, the first reason is specifically explained. The wind speed of the cooling air that is exhausted from the sirocco fan 60 is to be gradually reduced until the cooling air reaches the object to be cooled, due to friction and resistance of the surrounding. Consequently, the greater the distance between the sirocco fan 60 and the object to be cooled is, the lower the cooling capability becomes. One of the main factors of the decrease in the wind speed of the cooling air can be ventilation resistance for the cooling air to pass through the fins 45 that are provided in the heat sink 43.

Namely, for a case in which the surface area of the fins is large, the ventilation resistance for the cooling air to pass through the fins becomes large. As a result, the wind speed of the cooling air is reduced. The wind speed of the cooling air can be a parameter that may affect the cooling capability. As the wind speed of the cooling air is reduced, the cooling capability may be lowered. It may be difficult to achieve sufficient cooling capability with the cooling air that is sent to the other object to be cooled that is disposed at a position downstream of the heat sink 43 because the wind speed of the cooling air that passes through the fins having a large surface area is reduced.

For cooling the heat sink 43 itself, it may be effective that the surface area of the fins is large. As described above, for cooling the heat sink 43 itself, it can be effective to enlarge the surface area of the fins, but for cooling the other object to be cooled that is disposed at a position downstream of the heat sink 43, it can be effective to reduce the surface area of the fins. Namely, these conditions are in a tradeoff relationship.

Thus, in the embodiment, instead of designing the surface area of the fins to be uniform, there are provided the fins 451 having the large surface area and the fins 452 having the small surface area. Further, the configuration is adopted such that the cooling air that is exhausted from the second heat dissipation area 45b is sent to the object to be cooled at the downstream side by disposing the fins 452 having the small surface area that have small ventilation resistance at the side of the second exhaust area 73b through which a large flow amount of the cooling air is to be passed through. Then, the cooling air maintaining sufficient wind speed can be provided to the object to be cooled that is far from the sirocco fan 60 and that is disposed at the downstream side, thereby achieving desired cooling capability.

The heat sink 43 itself having the fins 451 can be effectively cooled by disposing the fins 451 having the large surface area that have large ventilation resistance at the side of the first exhaust area 73a through which a small flow amount of the cooling air is to be passed through.

Consequently, the cooling device 50 having the above-described configuration can effectively cool both the heat sink 43 and the light source device 20 by sending sufficient cooling air not only to the heat sink 43, but also to the the other object to be cooled (the light source device 20) that is disposed downstream the heat sink 43.

Next, there is explained a second reason for the configuration such that the second heat dissipation area 45b that includes the fins 452 having the large pitch is disposed at the side of the second exhaust area 73b where a large flow amount of the cooling air is to be passed through.

Namely, the second reason is for avoiding lowering the cooling capability inherent in the sirocco fan 60.

One of factors for lowering the cooling capability of the sirocco fan 60 may be to increase the static pressure by disposing members so as to close the exhaust port 73. That is, as it can be seen from the P-Q characteristic that shows the relationship between the static pressure of the fan and the wind volume, as a value P that represents the static pressure increases, a value Q that represents the wind volume becomes small, and the cooling capability is lowered.

Thus, by enlarging the surface area of the fins 452 of the second heat dissipation area 45b that faces the second exhaust area 73b where the wind speed is high in the exhaust port 73 of the sirocco fan 60, a wind volume of the sirocco fan 60 may be reduced. As a result, the cooling capability inherent in the the sirocco fan 60 may be reduced.

Thus, from the perspective of the cooling efficiency, it is desirable that the second exhaust area 73b where wind speed is high may have a configuration with which the opening may not be blocked, and it can be effective to dispose the second heat dissipation area 45b that includes the fins 452 having the large pitch.

From the above-described reasons, by implementing the configuration for arranging the second heat dissipation area 45b that includes the fins 452 having the large pitch at the side of the second exhaust area 73b where a large flow volume of the cooling air passes through, an effect can be obtained such that a plurality of objects can be effectively cooled without lowering the cooling capability of the sirocco fan 60.

Note that, in the cooling device 50 according to the embodiment, the upper surface of the heat sink 43 has a rectangular shape, so that the outer shape of the cooling device 50 can be a cubic shape. Consequently, for adjusting the cooling balance by varying the pitch of the fins 451 and/or the pitch of the fins 452 of the cooling device 50, design changes and/or layout changes of the peripheral devices of the cooling device 50, such as components and positions of a bracket for holding the sirocco fan 60, a connecting duct 80, and the light source device 20, may not be required.

<Cooling Structure>

Figure 13:
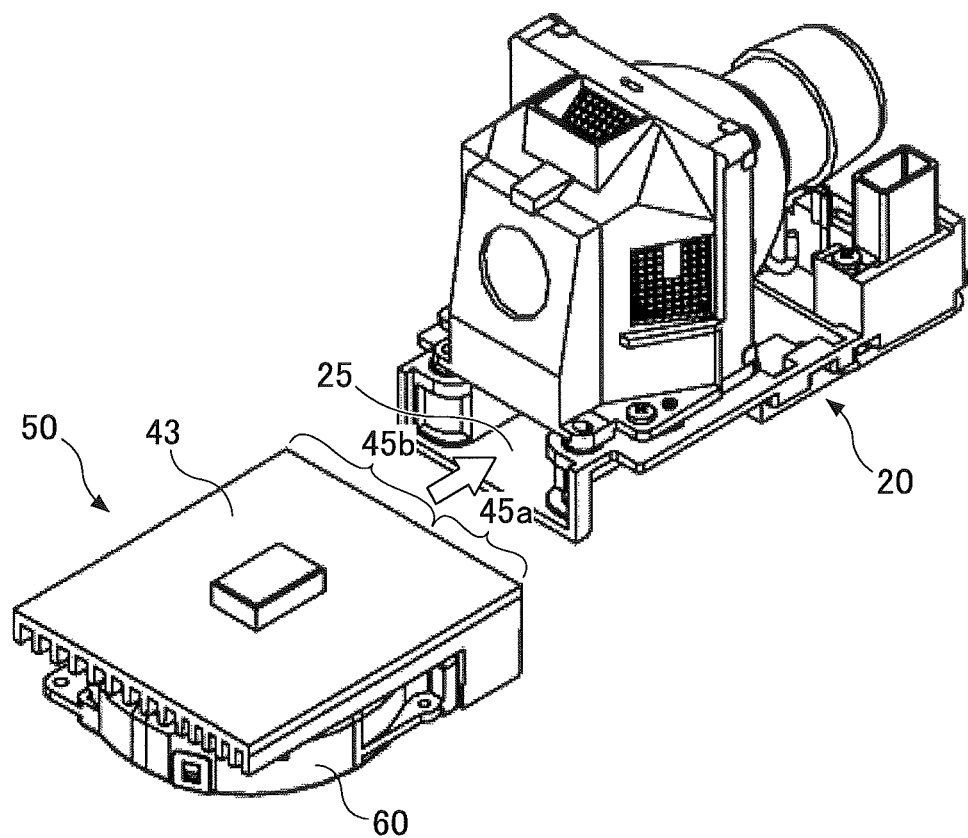
FIG. 13 is an overall perspective view showing an example of a cooling structure including the cooling device according to the embodiment.

Next, the cooling structure according to the embodiment of the present invention is explained. FIG. 13 is an overall perspective view showing the cooling structure including the cooling device 50 according to the embodiment. Specifically, an example is shown such that the light source device 20 is disposed as a second object to be cooled at a downstream side of the flow channel of the cooling air from the cooling device 50.

As shown in FIG. 13, in the cooling structure, the sirocco fan 60 that is a cooling source for forced-air cooling, the heat sink 43, and the light source device 20 that is the second object to be cooled are arranged in line, and a duct 25 for cooling the light source device 20 is connected on the line of the second heat dissipation area 45b in which the fins 452 are arranged. With such a configuration, the cooling air that passes through the second heat dissipation area 45b can enter inside the above-described duct 25 without reducing the wind volume, and the cooling air can be used for cooling the light source device 20. At the same time, in the first heat dissipation area 45a having the small pitch, the heat sink 43 is effectively cooled, as described above.

Thus, the cooling structure according to the embodiment can effectively perform cooling of the two components, which are the heat sink 43 (the DMD element 41) and the light source device 20, by the single sirocco fan 60.

Note that the light source device 20 may be cooled for preventing a burn during replacement of the lamp. During replacement of the lamp, a user may touch the bottom part of the light source device 20. Thus, the bottom part of the light source 20 can especially be cooled.

Figure 14:
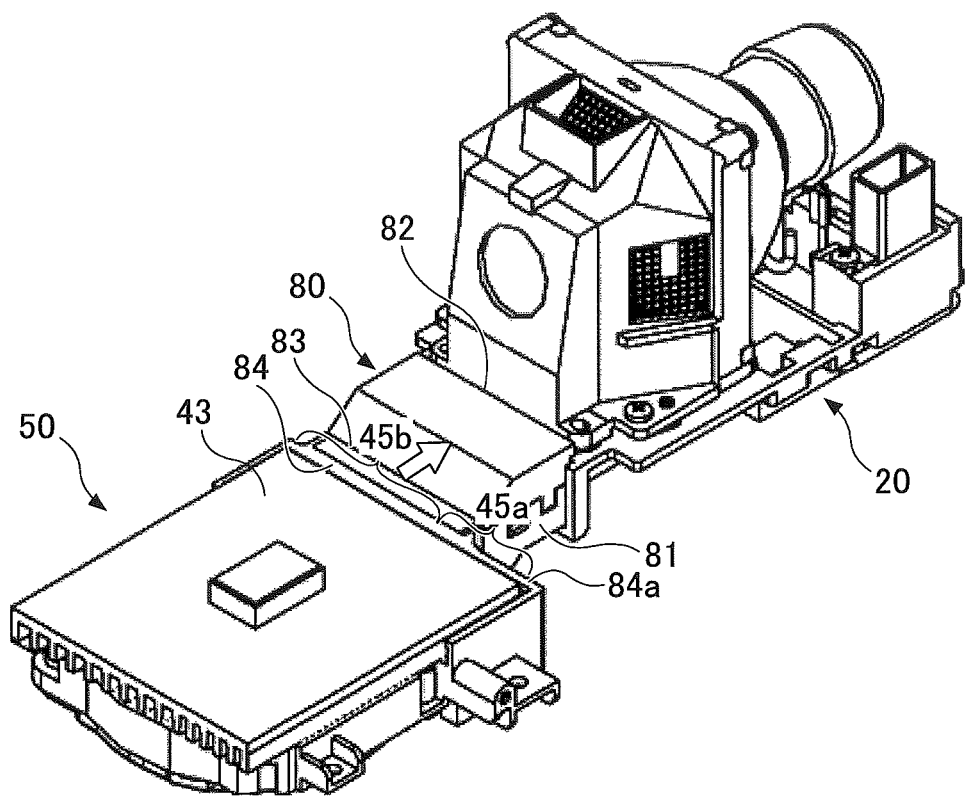
FIG. 14 is an overall perspective view showing an example of the cooling structure in which a duct is provided.
Figure 15:
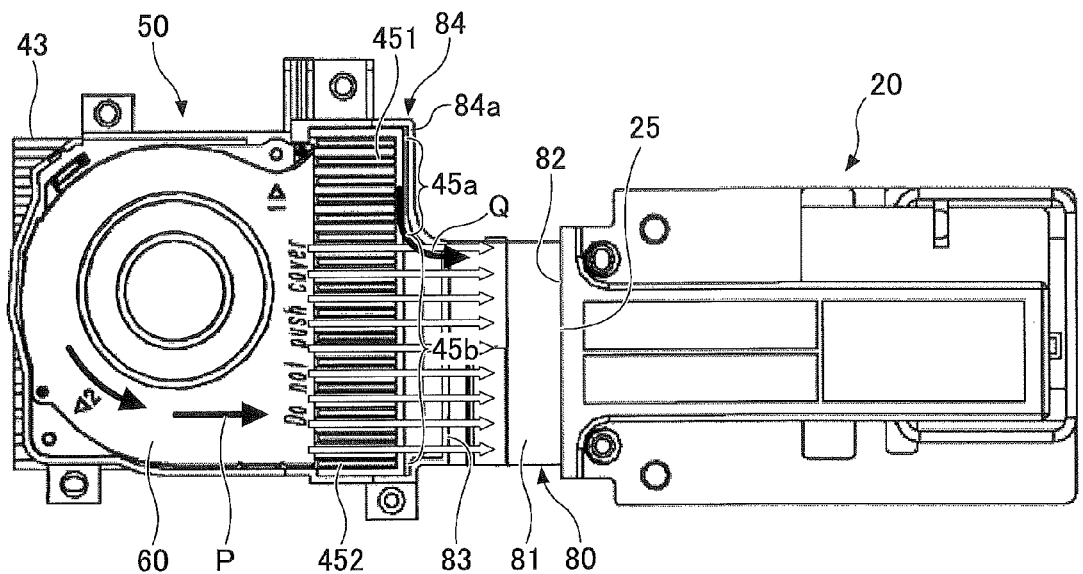
FIG. 15 is a bottom view of the cooling structure that is shown in FIG. 14.

Here, as a method for guiding the cooling air that passes through the second heat dissipation area 45b to the duct 25 for cooling the light source device 20 with fewer loss, it is preferable that the connecting duct 80 as shown in FIG. 14 may be newly provided. FIG. 15 is a diagram showing the cooling structure, which is viewed from the bottom side, to which the connecting duct 80 is connected.

This is for flowing the cooling air that is exhausted from the sirocco fan 60 to the light source 20 without leakage. By the function of the connecting duct 80 for guiding the air, the cooling efficiency can further be enhanced.

Namely, the connecting duct 80 includes a flow channel 81 for flowing the cooling air, and a tip 82 of the connecting duct 80 in the flowing direction of the cooling air is connected to the duct 25 of the light source device 20. A connecting portion 84 for nipping the side surfaces of the heat sink 43 between which the fins 45 are disposed is provided at a base end portion 83 of the connecting duct 80 in the flowing direction of the cooling air, and the connecting duct 80 is connected to the cooling device 50 by the connecting portion 84.

The flow channel 81 of the connecting duct 80 is provided on a line that is extended from the second heat dissipation area 45b. Thus, in the second heat dissipation area 45b, after high-speed cooling air passes through the fins 452 that are designed to have the large pitch toward a downstream side without the speed being reduced, the connecting duct 80 can effectively send the cooling air to the light source device 20 without leakage of the air.

The width of the flow channel 81 in the direction that is perpendicular to the flowing direction of the cooling air is formed to be slightly greater than that of the second heat dissipation area 45b, thereby ensuring the cooling air from the second heat dissipation area 45b to be flowed into the flow channel 81. As described above, the first object to be cooled by the cooling device 50 according to the embodiment is the DMD element 41 that is installed in the heat sink 43. Thus, a sufficient amount of the cooling air from the sirocco fan 60 can be applied to the heat sink 43.

By considering the above-described point, in the connecting portion 84 of the connecting duct 80, a collision wall 84a for colliding the cooling air that is exhausted from the first heat dissipation area 45a is provided in the vicinity of the first heat dissipation area 45a at the exhaust side. By the collision wall 84a, sufficient cooling air can be supplied to the tips of the fins 451 that are disposed in the first heat dissipation area 45a.

Namely, in general, the cooling air that passes through the fins 45 has a tendency such that the wind speed is greater at the entrance side of the fins 45, and the wind speed is gradually reduced, as the cooling air approaches to the exit. Thus, the cooling capability is lowered, as the position approaches to the exit of the fins 45 (which is also referred to as the exhaust side). By providing the collision wall 84a in the vicinity of the exhaust side of the fins 451 that are disposed in the first heat dissipation area 45a, the cooling air that is exhausted from the sirocco fan 60 collides with the collision wall 84a after the cooling air passing through the fins 451 that are disposed in the first heat dissipation area 45a. At that time, the flow of the cooling air is changed from a stream line flow to a turbulent flow, and the air is stirred in the vicinity of the exit of the fins 451. Thus, sufficient air can also be supplied to the tips of the fins 451 at the exhaust side.

However, if the whole surface in the vicinity of the exhaust side of the first heat dissipation area 45*a* is covered with the collision wall 84*a*, the static pressure is increased, and a wind volume characteristic that is inherent to the sirocco fan 60 may not be achieved. Thus, the static pressure of the sirocco fan 60 can be prevented from increasing by guiding the cooling air that passes through the first heat dissipation area 45*a* to the flow channel 81 (the arrow Q) by forming a connecting portion of the collision wall 84*a* that is connected to the flow channel 81 to have a smooth round shape. Additionally, the cooling air that passes through the first heat dissipation area 45*a* can be used as the cooling air for cooling the light source device 20 (the second object to be cooled).

As described above, the cooling device according to the embodiment can effectively cool both the heat sink 43 and the light source device 20 by flowing the sufficient cooling air not only to the heat sink 43 (which corresponds to the radiator), but also to the other object to be cooled (the light source device 20) that is disposed at a downstream side of the heat sink 43. Further, for adjusting the cooling balance by varying the pitch of the fins 451 and/or the pitch of the fins 452 of the cooling device 50, design changes and/or layout changes of the peripheral devices of the cooling device 50, such as components and positions of a bracket for holding the sirocco fan 60, a connecting duct 80, and the light source device 20, may not be required.

Second Embodiment

Cooling Device

Figure 16:
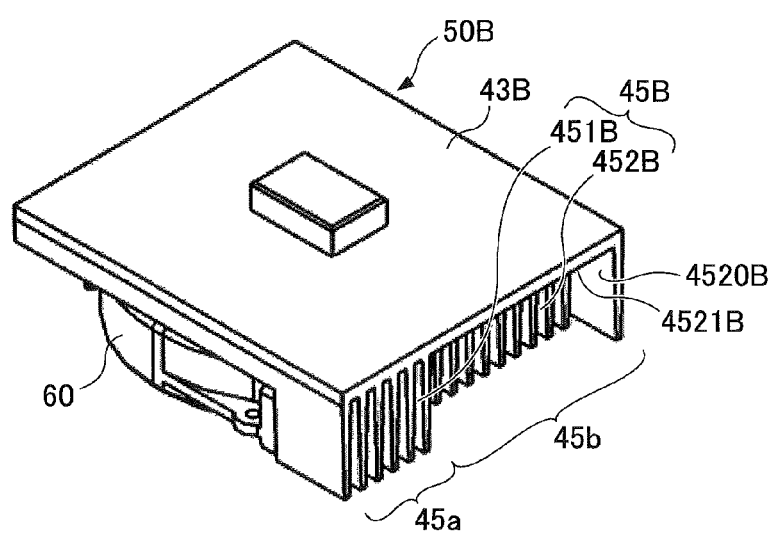
FIG. 16 is a perspective view showing an example of a configuration of the cooling device according to a second embodiment.
Figure 17:
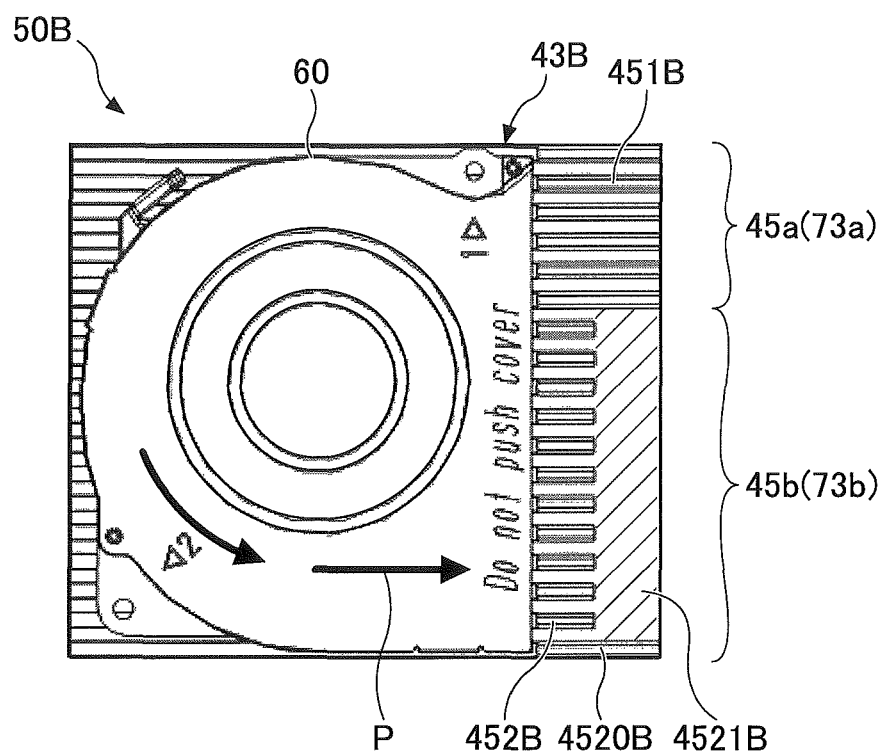
FIG. 17 is a bottom view of the cooling device that is shown in FIG. 16.

Next, the cooling device 50B according to a second embodiment of the present invention is explained by referring to FIGS. 16 and 17. FIG. 16 is an upper perspective view showing an example of an overall configuration of the cooling device 50B. FIG. 17 is a bottom view of an example of the cooling device 50B. Basically, the cooling device 50B has a configuration that is the same as the configuration that is explained in the first embodiment. Thus, only a difference between the cooling device 50 according to the first embodiment and the cooling device 50B according to the second embodiment are explained.

The difference of the cooling device 50B according to the second embodiment from the cooling device 50 according to the first embodiment is that, among the fins 45B, the surface area of the fins 451B that are disposed in the first heat dissipation area 45*a* is made different from the surface area of the fins 452B that are disposed in the second heat dissipation area 45*b* by differentiating the lengths of the fins 451B that are disposed in the first heat dissipation area 45*a* from the lengths of the fins 452B that are disposed in the second heat dissipation area 45*b*.

Namely, in the heat sink 43B according to the embodiment, two portions, namely, the first heat dissipation area 45*a* having a large surface area (which has high efficiency for dissipating the heat to the heat sink 43B) and the second heat dissipation area 45*b* having a small surface area (which means that the ventilation resistance is small) are formed by the difference between the lengths of the fins 451B and the lengths of the fins 452B.

Specifically, as shown in FIG. 17, the surface area of the fins 452B is made smaller than the surface area of the fins 451B by setting the lengths of the fins 452 that are disposed in the second heat dissipation area 45*b* of the heat sink 43B that is arranged to face the second exhaust area 73*b* where the wind volume is large to be less than the lengths of the fins 452B that are disposed in the first heat dissipation area 45*a*.

As described above, by reducing the surface area of the fins 452B that are disposed in the second exhaust area 73*b* where a large flow amount of the cooling air is to be passed through, the ventilation resistance is reduced, and the cooling air can be easily passed through. Thus, sufficient cooling air can be sent to the other object to be cooled that is disposed at the downstream side of the heat sink 43B.

Further, the lengths of the fins 451B that are disposed in the first heat dissipation area 45*a* that is arranged to face the first exhaust area 73*a* where a small flow amount of the cooling air is to be passed through are approximately twice as much as the lengths of the above-described fins 452B. Note that the fin pitch of the fins 451B is the same as that of the fins 452B. The difference between the surface area of the first heat dissipation area 45*a* and the surface area of the second heat dissipation area 45*b* is the same as that of the first embodiment.

As described above, by enlarging the surface area of the fins 451B that are disposed in the first exhaust area 73*a* where the small amount of the cooling air is to be passed through, the heat sink 43 can be effectively cooled.

In the embodiment, though the lengths of the fins 452B are different from that of the fins 451B, the side edges of the upper surface of the heat sink 43 are linearly arranged, and the shape of the upper surface and the size of the cooling device 50 (the external shape) are the same as those of the first embodiment. As described above, in order to avoid changing the shape, an upper wall 4521B is formed at a portion (the shaded area in FIG. 17) where the lengths of the fins 452B are short. Note that the upper wall 4521B has a function to prevent the cooling air from leaking.

Note that a single edge fin 4520B that is disposed at the outermost side among the fins 452B that are disposed in the second heat dissipation area 45*b* has the length that is the same as the lengths of the fins 451B that are disposed in the first heat dissipation area 45*a*. That is for avoiding, by the edge fin 4520B, the flow of the cooling air that is exhausted from the second heat dissipation area 45*b* from being perturbed, and to use the second heat dissipation area 45*b* as a guide channel for guiding the cooling air to the light source device 20. Further, in the cooling structure that is described below, the edge fin 4520B has a function to prevent the cooling air from leaking the second heat dissipation area 45*b* that is connected to the flow channel 81 of the connecting duct 80 that is connected to the light source device 20.

The cooling device 50B according to the second embodiment is different from the cooling device 50 according to the first embodiment in the lengths and the pitches of the fins 452B and the fins 451B. However, the cooling device 50B according to the second embodiment can also effectively cool both the heat sink 43B and the object to be cooled that is disposed at a downstream side of the heat sink 43B by sending sufficient cooling air not only to the heat sink 43B, but also to the object to be cooled (the light source device 20) that is disposed at the downstream side of the heat sink 43B, without lowering the cooling capability of the sirocco fan 60.

Further, the shape of the upper surface of the heat sink 43B and the outer shape of the cooling device 50B according to the second embodiment are the same as those of the first embodiment. Consequently, a heat sink can be replaced with another heat sink for which the cooling balance is favorably adjusted without changing the design of the peripheral devices of a bracket for holding the sirocco fan 60 and the heat sink. Additionally, necessity for changing the layout and/or design of the peripheral components (peripheral devices) of the cooling device 50B can be minimized.

Further, in the embodiment, the lengths of the fins are altered as a parameter for changing the surface area. This alteration can be achieved by using the same metal mold and by changing the secondary process. Alternatively, this alteration can be achieved by using the same metal mold and by changing bushing of the metal mold. Thus, the cost associated with the alteration can be kept small.

<Cooling Structure>

Figure 18:
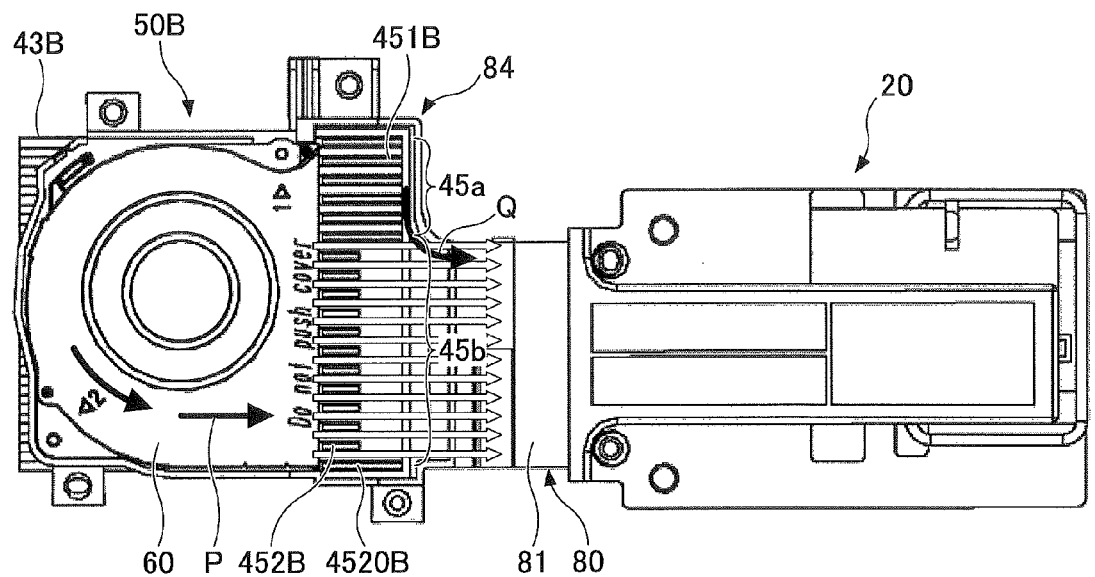
FIG. 18 is a bottom view showing an example of the cooling structure that includes the cooling device according to the second embodiment.

FIG. 18 shows an example of the cooling structure in which the cooling device 50B according to the second embodiment is used. FIG. 18 is a bottom view of the cooling structure. Depiction of the upper perspective view of the cooling structure is omitted because it is completely the same as that of FIG. 14.

The cooling structure according to the second embodiment is almost the same as that of the first embodiment. The cooling structure according to the second embodiment has a configuration such that the cooling device 50B, the connecting duct 80, and the light source device 20 are arranged in line. Thus, a duplicate explanation is omitted.

Note that the upper perspective view of the cooling structure according to the second embodiment is the same as that of FIG. 14 because the shape of the upper surface of the heat sink 43B and the external shape of the cooling device 50B are the same as those of the first embodiment, even if the lengths of the fins 451B and the fins 452B of the heat sink 43B are different.

The cooling structure in which the cooling device 50B according to the second embodiment is used is different from that of the first embodiment in the lengths of the fins 452B of the cooling device 50B, but the difference between the surface area of the fins 451B and the surface area of the fins 452B is the same as the difference between the surface area of the fins 451 and the surface area of the fins 452. Thus, in the second embodiment, the flow of the air is the same as that of the first embodiment, and the cooling air that is exhausted from the second heat dissipation area 45b can be effectively sent to the light source device 20, and the light source device 20 can be cooled. Namely, in the cooling structure according to the second embodiment, sufficient cooling air can be flowed not only to the heat sink 43B (which corresponds to the radiator), but also to the other object to be cooled (the light source device 20) that is disposed at a downstream side of the heat sink 43B, so that the cooling structure according to the second embodiment can effectively cool both the heat sink 43B and the light source device 20. Further, even if the cooling balance is altered by changing the shapes of the fins 452B, design changes and/or layout changes of the peripheral devices of the cooling device 50B, such as components and positions of a bracket for holding the sirocco fan 60, the connecting duct 80, and the light source device 20, may not be required.

Third Embodiment

Cooling Device

Figure 19:
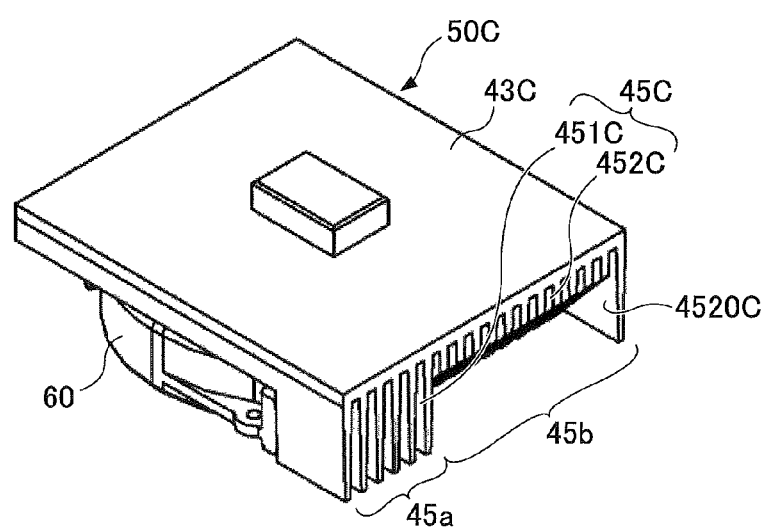
FIG. 19 is a perspective view showing an example of a configuration of the cooling device according to a third embodiment.
Figure 20:
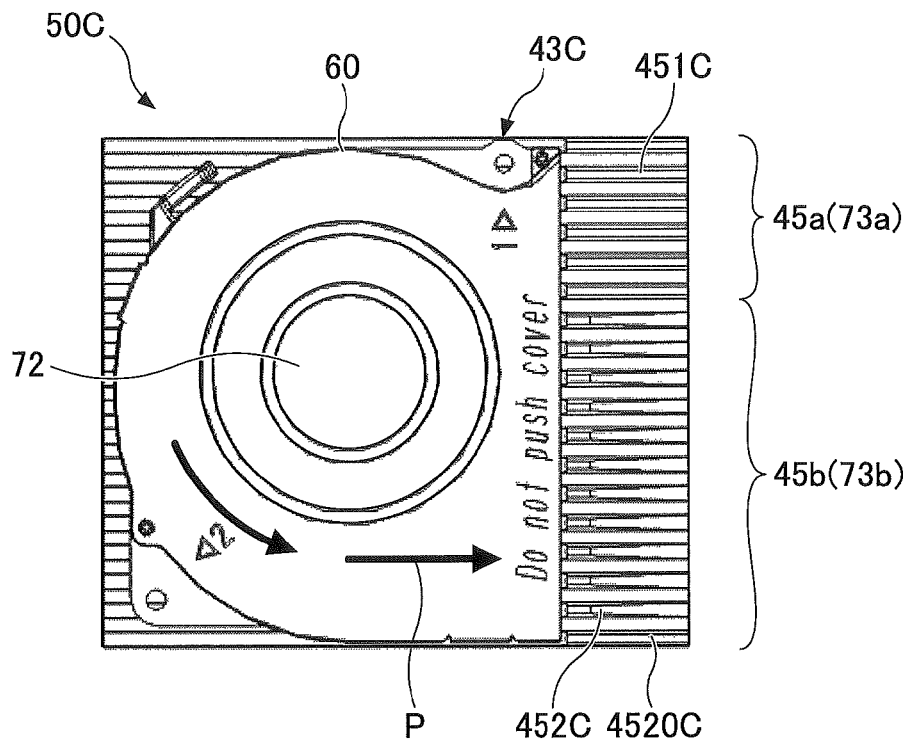
FIG. 20 is a bottom view of the cooling structure that is shown in FIG. 19.
Figure 21:
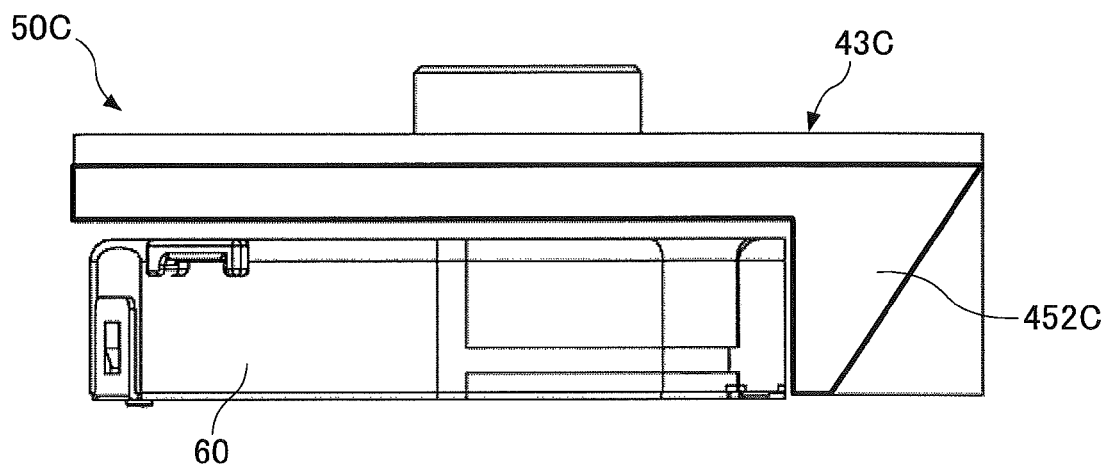
FIG. 21 is a side view schematically showing a shape of a fin that is disposed in a second heat dissipation area.

Next, the cooling device 50C according to a third embodiment is explained by referring to FIGS. 19-21. FIG. 19 is an upper perspective view showing an example of an overall configuration of the cooling device 50C. FIG. 20 is a bottom view of the cooling device 50C. FIG. 21 is a side view schematically showing the shape of the fin 452C. Basically, the configuration according to the third embodiment is the same as that of the first embodiment. Thus, only the differences are explained.

The third embodiment is different from the first embodiment in a point that, among the fins 45C, the surface area of the fins 452C is made smaller than the surface area of the fins 451C by changing the shapes (cross-sections) of the fins 452C that are disposed in the second heat dissipation area 45b from the shapes of the fins 451C that are disposed in the first heat dissipation area 45a. Note that the surface area of the fins 451C is enlarged by making the shapes and the height of the fins 451C to be the same as those of the first and second embodiments. Namely, in the heat sink 43C according to the third embodiment, two portions, namely, the first heat dissipation area 45a having the large surface area (which has high efficiency for dissipating the heat to the heat sink 43C) and the second heat dissipation area 45b having the small surface area (which means that the ventilation resistance is small) are formed by the difference between the shapes of the fins 451C and the shapes (the cross-sectional shape) of the fins 452C.

In this manner, by reducing the surface area of the fins 452C in the second heat dissipation area 45b where a large amount of the cooling air is to be passed through, the cooling air can be easily passed through. Thus, sufficient cooling air can be sent to the other object to be cooled (the light source device 20) that is disposed at the downstream side of the heat sink 43C. Note that the difference between the surface area of the first heat dissipation area 45a and the surface area of the second heat dissipation area 45b is the same as that of the first embodiment.

Specifically, as shown in the schematic side view of FIG. 21, the cross-section (a longitudinal section) of the fins 452C has a shape that is narrowed downward. In the depicted example, the surface of the fins 452C at the side of the sirocco fan 60 protrudes vertically, and the other surface of the fins 452C is tilted downward by approximately 45 degrees toward inside. The sirocco fan 60 can be favorably arranged because of the shape such that the surface of the fins 452C at the side of the sirocco fan 60 protrudes vertically without being tilted. Thus, a loss of the heat dissipation effect can be avoided which may be caused by providing useless gap. Further, while the surface area is reduced (the ventilation resistance is reduced), the shape of the upper surface of the heat sink 43C can be kept the same as that of the first embodiment, because of the shape of the other surface of the fins 452C that is tilted downward toward inside. Namely, the shape of the heat sink 43C can be maintained such that the side edges of the upper surface of the heat sink 43C are linearly aligned.

Similar to the first and second embodiment, the surface area of the fins 451C is large. Here, the fins 451C are disposed in the first exhaust area 73a where a small flow amount of the cooling air is to be passed through. Thus, the heat sink 43 itself can be effectively cooled.

Note that a single edge fin 4520C that is disposed at the outermost side (at the side of the side surface) among the fins 452C that are disposed in the second heat dissipation area 45b has the length and shape that are the same as the lengths and shapes of the fins 451C that are disposed in the first heat dissipation area 45a. That is to avoid, by the edge fin 4520C, the flow of the cooling air that is exhausted from the second heat dissipation area 45b from being perturbed, and to use the second heat dissipation area 45b as a guide channel for guiding the cooling air to the light source device 20. Further, in the cooling structure that is described below, the edge fin 4520C can cause the cooling air to flow, without leaking the cooling air (without a loss), to the flow channel 81 of the connecting duct 80 that is connected to the light source device 20.

The cooling device 50C according to the third embodiment is different from those of the first and second embodiments in the shapes of the fins 452C. However, the cooling device 50C according to the third embodiment can also effectively cool both the heat sink 43C and the object to be cooled that is disposed at a downstream side of the heat sink 43C by sending sufficient cooling air not only to the heat sink 43C, but also to the object to be cooled (the light source device 20) that is disposed at the downstream side of the heat sink 43C, without lowering the cooling capability of the sirocco fan 60.

Further, in the embodiment, the shapes of the fins are altered as a parameter for changing the surface area. This alteration can be achieved by using the same metal mold and by changing the secondary process. Alternatively, this alteration can be achieved by using the same metal mold and by changing bushing of the metal mold. Thus, the cost associated with the alteration can be kept small.

<Cooling Structure>

Figure 22:
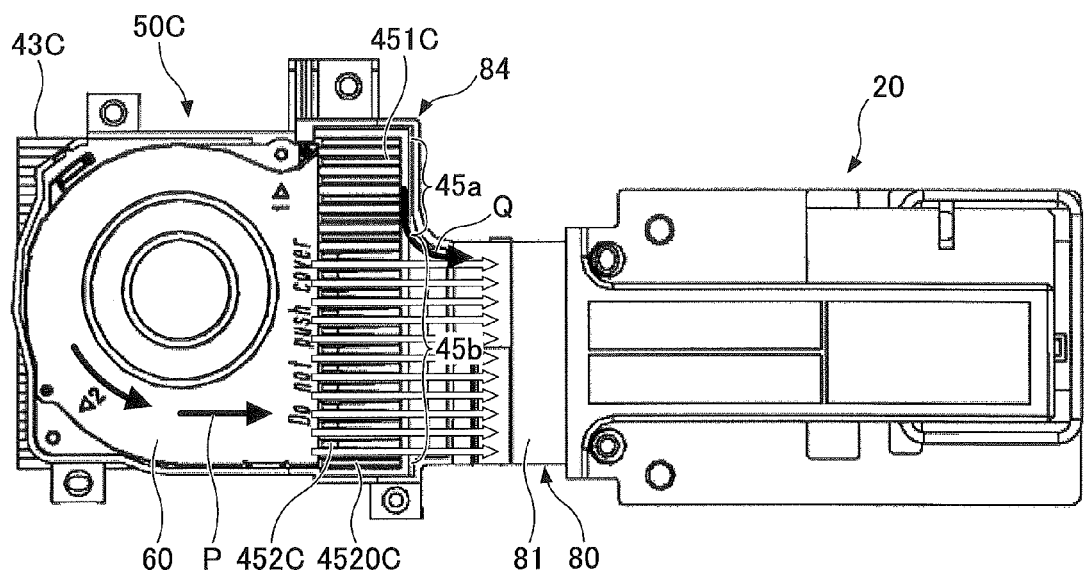
FIG. 22 is a bottom view showing an example of the cooling structure that includes the cooling device according to the third embodiment.

FIG. 22 shows an example of the cooling structure in which the cooling device 50C according to the third embodiment is used. FIG. 22 is a bottom view of the cooling structure. Depiction of the upper perspective view of the cooling structure is omitted because it is completely the same as that of FIG. 14.

The cooling structure according to the third embodiment is almost the same as that of the first embodiment. The cooling structure according to the third embodiment has a configuration such that the cooling device 50C, the connecting duct 80, and the light source device 20 are arranged in line. Thus, a duplicate explanation is omitted.

Note that the upper perspective view of the cooling structure according to the third embodiment is the same as that of FIG. 14 because the shape of the upper surface of the heat sink 43C and the external shape of the cooling device 50C are the same as those of the first embodiment, even if the shapes of the fins 451C and the fins 452C of the heat sink 43C are different.

The cooling structure in which the cooling device 50C according to the third embodiment is used is different from those of the first and second embodiments in the shapes of the fins 452C of the cooling device 50C, but the difference between the surface areas between the fins 451C and the fins 452C are the same as the difference between the surface areas between the fins 451 and the fins 452. Thus, in the third embodiment, the flow of the air is the same as those of the first and second embodiments, and the cooling air that is exhausted from the second heat dissipation area 45b can be effectively sent to the light source device 20, and the light source device 20 can be cooled. Namely, in the cooling structure according to the third embodiment, sufficient cooling air can be flowed not only to the heat sink 43C (which corresponds to the radiator), but also to the other object to be cooled (the light source device 20) that is disposed at a downstream side of the heat sink 43C, so that the cooling structure according to the third embodiment can effectively cool both the heat sink 43C and the light source device 20.

Further, even if the cooling balance is altered by changing the shapes of the fins 452C, design changes and/or layout changes of the peripheral devices of the cooling device 50C, such as components and positions of a bracket for holding the sirocco fan 60, the connecting duct 80, and the light source device 20, may not be required.

Fourth Embodiment

Cooling Device

Figure 23:
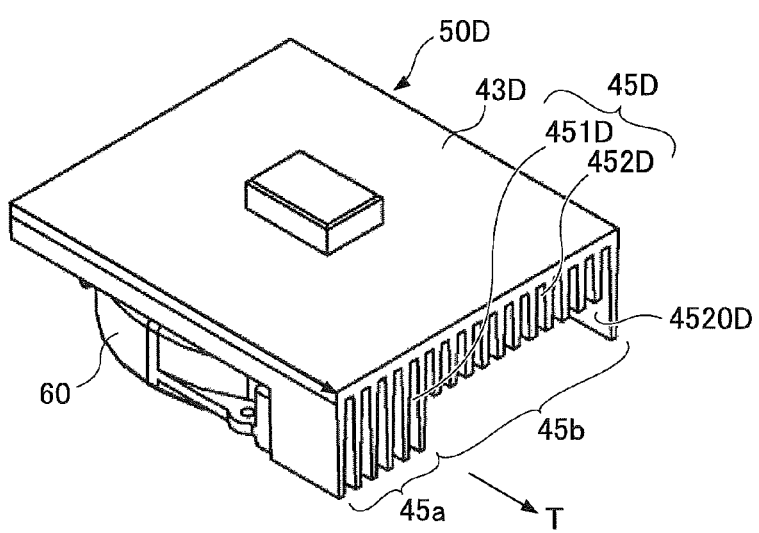
FIG. 23 is a perspective view showing an example of a configuration of the cooling device according to a fourth embodiment.
Figure 24:
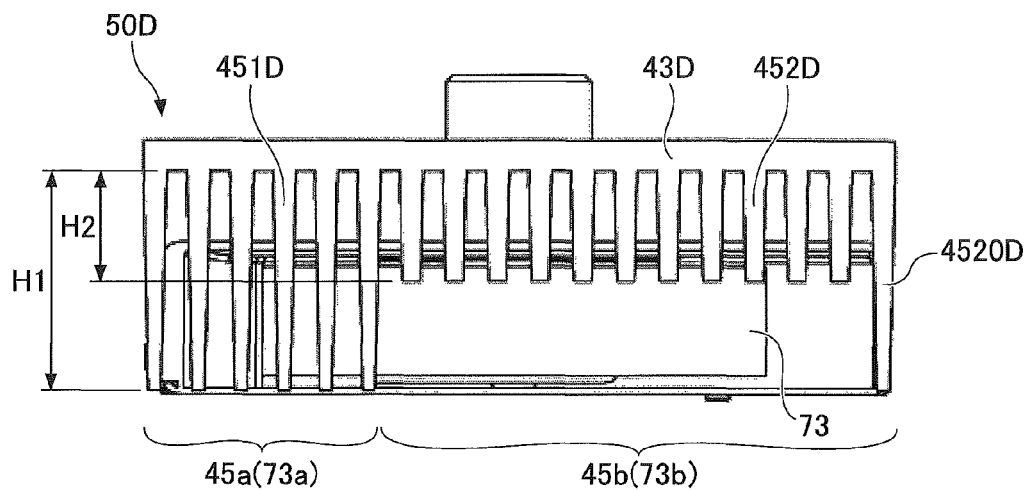
FIG. 24 is a front view of the cooling device shown in FIG. 23, which is viewed from a position in front of the cooling device with respect to a flowing direction of cooling air.

Next, the cooling device 50D according to a fourth embodiment is explained by referring to FIGS. 23 and 24. FIG. 23 is an upper perspective view showing an example of an overall configuration of the cooling device 50D. FIG. 24 is a front view showing the cooling device 50D of FIG. 23, which is viewed from a front position with respect to the flowing direction T of the cooling air. Basically, the configuration according to the fourth embodiment is the same as that of the first embodiment. Thus, only the differences are explained.

The fourth embodiment is different from the first embodiment in a point that, among the fins 45D, the surface area of the fins 452D is made smaller than the surface area of the fins 451D by reducing the height of the fins 452D that are disposed in the second heat dissipation area 45b relative to the height of the fins 451D that are disposed in the first heat dissipation area 45a. Note that the surface area of the fins 451D is enlarged by making the shapes (a longitudinal section) and the height of the fins 451D to be the same as those of the first to third embodiments. Namely, in the heat sink 43D according to the fourth embodiment, two portions, namely, the first heat dissipation area 45a having the large surface area (which has high efficiency for dissipating the heat to the heat sink 43D) and the second heat dissipation area 45b having the small surface area (which means that the ventilation resistance is small) are formed by the difference between the height of the fins 451D and the height of the fins 452D.

In this manner, by reducing the surface area of the fins 452D in the second heat dissipation area 45b where a large flow amount of the cooling air is to be passed through, the cooling air can be easily passed through. Thus, sufficient cooling air can be sent to the other object to be cooled (the light source device 20) that is disposed at the downstream side of the heat sink 43D. The difference between the surface area of the first heat dissipation area 45a and the surface area of the second heat dissipation area 45b is the same as that of the first embodiment.

Specifically, as shown in FIG. 24, the surface area of the fins 452D is made smaller than the surface area of the fins 451D by reducing the height H2 of the fins 452D that are disposed in the second heat dissipation area 45b that faces the second exhaust area 73b with respect to the height H1 (H2<H1) of the fins 451D that are disposed in the first heat dissipation area 45a that faces the first exhaust area 73a.

The surface area of the fins 451D is enlarged with respect to the surface area of the fins 452D by making the height H1 of the fins 451D to be the same as those of the first to third embodiment. The height H2 of the fins 452D is designed to be the same as the distance between the upper part of the heat sink 43D and the position of the upper part of the second exhaust area 73b of the exhaust port 73 of the sirocco fan 60. Namely, the fins 452D almost do not exist at the side facing the second exhaust area 73b, so that the second exhaust area 73b can be in an opened state.

Thus, the cooling air that is exhausted from the bottom of the second exhaust area 73b can pass through the fins 452D in a state in which the ventilation resistance does not exist. Consequently, sufficient cooling air can be sent to the object to be cooled (the second object to be cooled) that is disposed at a downstream side of the heat sink 43D, and the cooling efficiency can be significantly enhanced.

In the forth embodiment, the height of the fins 452D is less than the height of the fins 451D, but the shape of the upper surface of the heat sink 43D and the size of the heat sink 43D are not changed. Namely, the shape of the heat sink 43D is maintained such that the side edges of the upper surface of the heat sink 43D are linearly aligned.

Note that a single edge fin 4520D that is disposed at the outermost side (at the side of the side surface) among the fins 452D that are disposed in the second heat dissipation area 45b has the height H1 that is the same as the height of the fins 451D that are disposed in the first heat dissipation area 45a. That is to avoid, by the edge fin 4520D, the flow of the cooling air that is exhausted from the second heat dissipation area 45b from being perturbed, and to use the second heat dissipation area 45b as a guide channel for guiding the cooling air to the light source device 20. Further, in the cooling structure that is described below, the edge fin 4520D can prevent the cooling air from leaking the second heat dissipation area 45b that is connected to the flow channel 81 of the connecting duct 80 that is connected to the light source device 20.

The cooling device 50D according to the fourth embodiment is different from that of the first embodiment in the height of the fins 452D. However, the cooling device 50D according to the fourth embodiment can also effectively cool both the heat sink 43D and the object to be cooled that is disposed at a downstream side of the heat sink 43D by sending sufficient cooling air not only to the heat sink 43D, but also to the object to be cooled (the light source device 20) that is disposed at the downstream side of the heat sink 43D, without lowering the cooling capability of the sirocco fan 60.

Further, in the embodiment, the shapes of the fins are altered as a parameter for changing the surface area. This alteration can be achieved by using the same metal mold and by changing the secondary process. Alternatively, this alteration can be achieved by using the same metal mold and by changing bushing of the metal mold. Thus, the cost associated with the alteration can be kept small.

<Cooling Structure>

Figure 25:
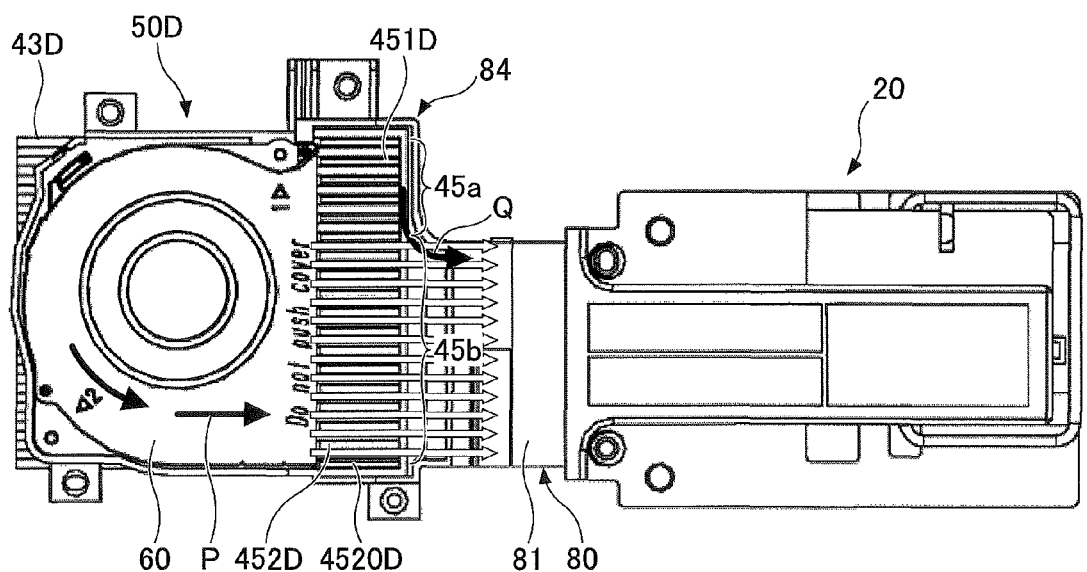
FIG. 25 is a bottom view showing an example of the cooling structure that includes the cooling device according to the fourth embodiment.

FIG. 25 shows an example of the cooling structure in which the cooling device 50D according to the fourth embodiment is used. FIG. 25 is a bottom view of the cooling structure. Depiction of the upper perspective view of the cooling structure is omitted because it is completely the same as that of FIG. 14. It can be seen that the cooling structure in which the cooling device 50D according to the fourth embodiment is used is substantially the same as that of FIG. 15, when it is viewed from the bottom side.

Note that the upper perspective view and the bottom view of the cooling structure according to the fourth embodiment are the same as those of FIGS. 14 and 15, respectively, because the shape of the upper surface of the heat sink 43D and the external shape of the cooling device 50D are maintained, even if the height of the fins 452D of the heat sink 43D is set to be less than the height of the fins 451D.

The cooling structure in which the cooling device 50D according to the fourth embodiment is used is different from those of the first to third embodiments in the shapes of the fins 452D of the cooling device 50D, but the difference between the surface area of the fins 451D and the surface area of the fins 452D is the same as the difference between the surface area of the fins 451 and the surface area of the fins 452. Thus, in the fourth embodiment, the flow of the air is the same as those of the first to third embodiments, and the cooling air that is exhausted from the second heat dissipation area 45b can be effectively sent to the light source device 20, and the light source device 20 can be cooled.

Namely, in the cooling structure according to the fourth embodiment, sufficient cooling air can be flowed not only to the heat sink 43D (which corresponds to the radiator), but also to the other object to be cooled (the light source device 20) that is disposed at a downstream side of the heat sink 43D, so that the cooling structure according to the fourth embodiment can effectively cool both the heat sink 43D and the light source device 20. Further, even if the cooling balance is altered by changing the shapes of the fins 452D, design changes and/or layout changes of the peripheral devices of the cooling device 50D, such as components and positions of a bracket for holding the sirocco fan 60, the connecting duct 80, and the light source device 20, may not be required.

Fifth Embodiment

Hereinafter, the image projection device 1 according to a fifth embodiment of the present invention is explained. The image projection device 1 according to the fifth embodiment may include any one of the cooling device 50 according to the first embodiment; the cooling device 50B according to the second embodiment; the cooling device 50C according to the third embodiment; and the cooling device 50D according to the fourth embodiment, which are described above.

As explained by referring to FIGS. 1 to 9, the specific configuration of the image projection device 1 may include the cooling device 50 (or 50B, 50C, or 50D); the light source device 20; the DMD element 41 (an image display element); the projection optical unit 33; the optical engine 30, and so forth. These components are explained above. Thus, explanations of these components are omitted.

Further, in the image projection device 1, any one of the cooling device 50 according to the first embodiment, the cooling device 50B according to the second embodiment, the cooling device 50C according to the third embodiment, and the cooling device 50D according to the fourth embodiment, which are described above, is to be installed. Thus, the explanation of the image projection device 1 is omitted. Further, the cooling structure in which any one of the cooling device 50 according to the first embodiment, the cooling device 50B according to the second embodiment, the cooling device 50C according to the third embodiment, and the cooling device 50D according to the fourth embodiment is used is the same as those of the first to fourth embodiment. Thus, explanations of the cooling structures are omitted.

Thus, the image projection device 1 may include the cooling device 50 (or 50B, 50C, or 50D, which includes the cooling structure) depending on the type, the size, and/or the performance of the projection device 1. In this manner, the image projection device 1 according to the fifth embodiment may achieve a favorable image projection function.

The above-described heat sink, the cooling device, and the cooling structure can be used not only for the image projection device 1, but also for an electronic device, such as a normal personal computer, or an electronic circuit.

Sixth Embodiment

Figure 26:
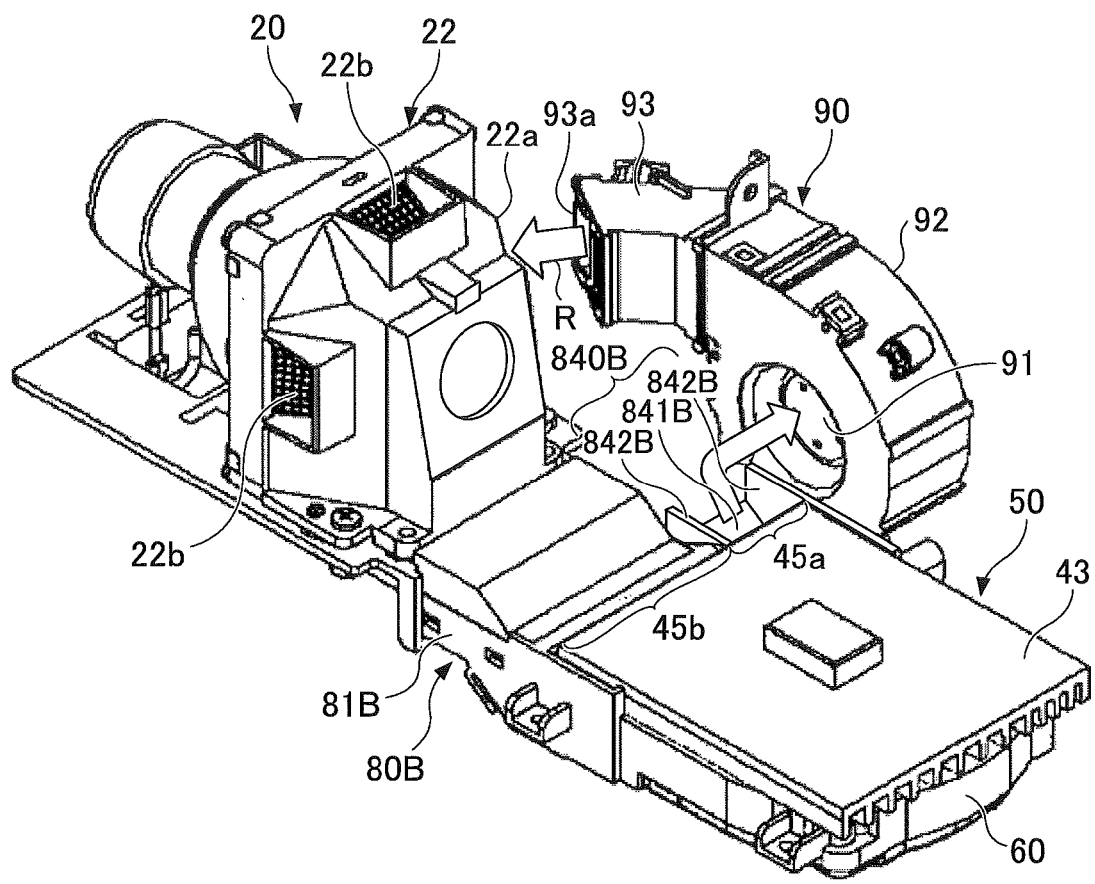
FIG. 26 is an upper perspective view showing an example of the cooling structure according to a sixth embodiment.
Figure 27:
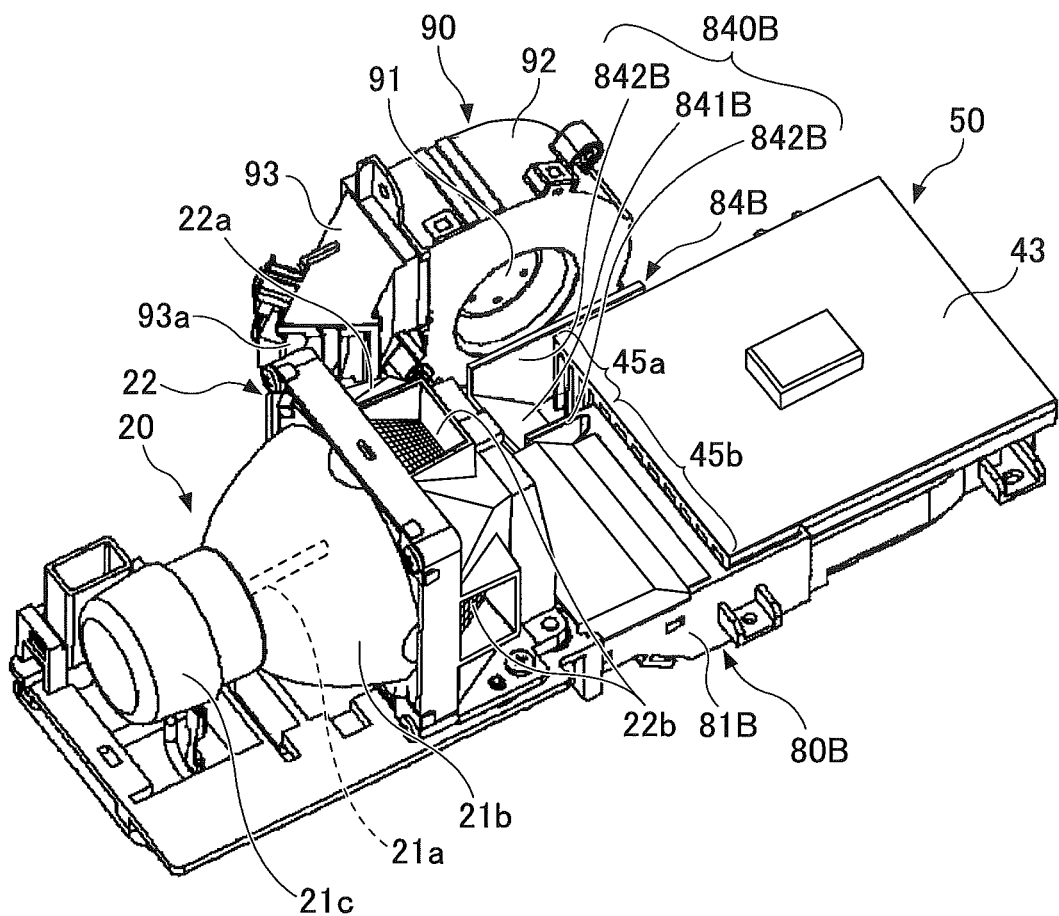
FIG. 27 is an upper perspective view showing the cooling structure shown in FIG. 26, which is viewed in a different angle.
Figure 28:
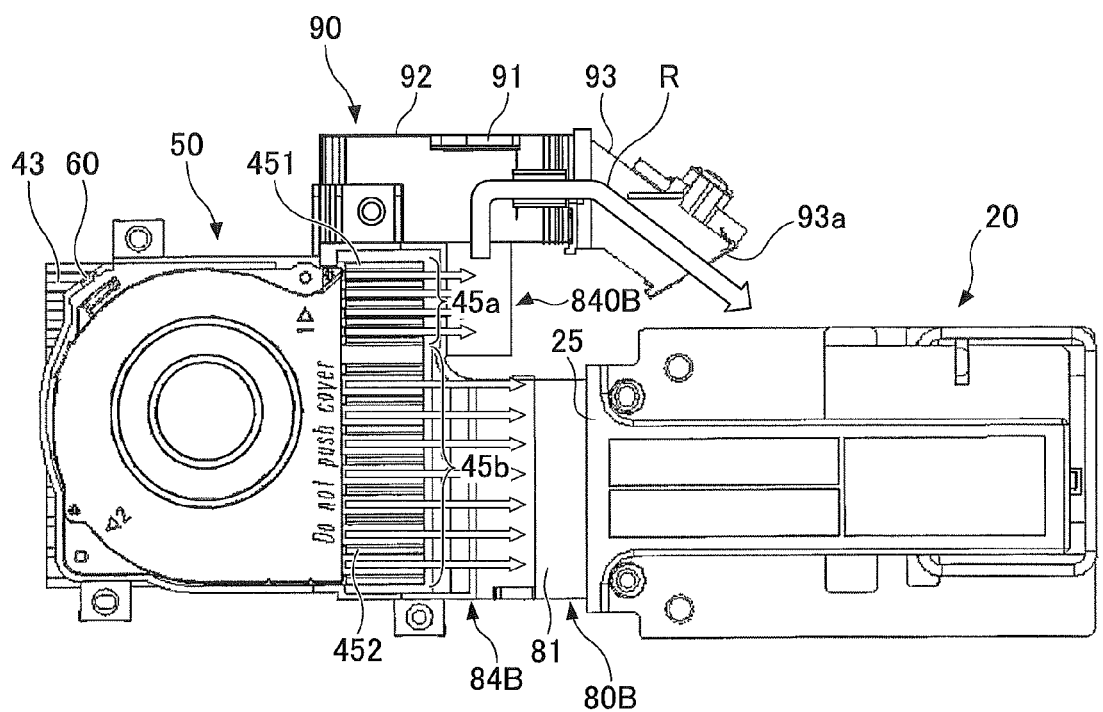
FIG. 28 is a bottom view showing the cooling structure that is shown in FIGS. 26 and 27.

Hereinafter, the cooling structure according to a sixth embodiment is explained by referring to FIGS. 26-29. FIG. 26 is an upper perspective view showing an example of an overall configuration of the cooling structure. FIG. 27 is an upper perspective view showing the example of the overall configuration of the cooling structure, which is viewed from another angle. FIG. 28 is a bottom view of FIGS. 26 and 27. The cooling structure according to the sixth embodiment has a configuration which is different from the cooling structures according to the first to fourth embodiments. In the cooling structure according to the sixth embodiment, any one of the cooling devices 50, 50B, 50C, and 50D according to the first to fourth embodiments can be installed. In the FIGS. 26 to 29, an example is depicted such that the cooling device 50 according to the first embodiment is installed in the cooling structure.

However, the cooling structure according to the sixth embodiment is based on a technical concept that is substantially the same as those of the cooling structures that are explained in the first to fourth embodiments. Thus, the differences are mainly explained below. Specifically, the cooling structure according to the sixth embodiment can be implemented in the image projection device 1 according to the fifth embodiment. The cooling structure according to the sixth embodiment may include a light cooling duct 90 (which corresponds to a duct unit). The light cooling duct 90 may cause the cooling air that is flowed in through the inlet port 6 (cf. FIG. 1) to be flowed into the light source inlet port 22a that is provided in the light source housing 22.

The light cooling duct 90 may include a main body 92; and a flow channel 93. The main body 92 may include a sirocco fan 91 that is disposed at a base end portion (which corresponds to a blower). The flow channel 93 is connected to the main body 92, and the flow channel 93 includes an exhaust port 93a that is provided at a tip portion. Thus, the light cooling duct 90 can cause the cooling air to be flowed into the light source inlet port 22a of the light source housing 22 from the exhaust port 93a by using the sirocco fan 91. The sirocco fan 91 has a function to intake the air that exists in the vicinity of the sirocco fan 91, and the air that is flowed in through the inlet port 6.

Note that the cooling structure according to the sixth embodiment includes the connecting duct 80B that is explained in the explanations of the cooling structures according to the first to fourth embodiments (cf. FIGS. 14 and 15, for example).

The connecting duct 80 according to any one of the first to fourth embodiments is for sending the entire cooling air that is exhausted from the sirocco fan 60 to the light source device 20 without leaking the cooling air. Thus, in the collision wall 84a of the connecting portion 84 that is provided in the vicinity of the exhaust side of the first heat dissipation area 45a, the end portion that is connected to the flow channel 81 has the smooth round shape, and the end portion guides the cooling air that passes through the first heat dissipation area 45a to the flow channel 81.

However, the connecting duct 80B that is used for the cooling structure according to the sixth embodiment is different from the connecting duct 80 according to any one of the first to fourth embodiments in a point that the connecting duct 80B includes a unit that is for causing the cooling air that passes through the first heat dissipation area 45a to be flowed into the light source inlet port 22a of the light source housing 22 through the light cooling duct 90. Namely, in the connecting duct 80B, a guide unit 840B for guiding the cooling air that passes through the first heat dissipation area 45a toward the light cooling duct 90 is provided at the connecting portion 84B that nips the side surfaces of the heat sink 43 at which the fins 45 are disposed.

The guide unit 840B includes a slope 841B; and side wall portions 842B. In the slope 841B, an upper portion is tilted toward the side of the light source device 20 at the connecting portion 84 in the vicinity of the exhaust side of the first heat dissipation area 45a. The sidewall portions 842B are connected to the side surfaces of the slope 841B, respectively. Thus, the cooling air that passes through the first heat dissipation area 45a is guided by the guide unit 840B toward the vicinity of the sirocco fan 91 of the light cooling duct 90.

Then, the sirocco fan 91 suctions the guided cooling air that passes through the fins 451 of the first heat dissipation area 45a. The sirocco fan 91 can cause the suctioned cooling air to be flowed into the light source inlet port 22a of the light source housing 22 from the exhaust port 93a. Thus, the cooling air that passes through the fins 451 of the first heat dissipation area 45a can be used as the cooling air that is to be flowed into inside the light source device 20. Note that, at this time, the sirocco fan 91 suctions, in addition to the guided cooling air, the air (cooling air) that is flowed in through the inlet port 6 that is disposed in the vicinity of the sirocco fan 91. Similar to the first to fourth embodiments, the cooling air that passes through the second heat dissipation area 45b is caused to be flowed into the duct 25 of the light source device 20 through the flow channel 81 of the connecting duct 80B.

Figure 29:
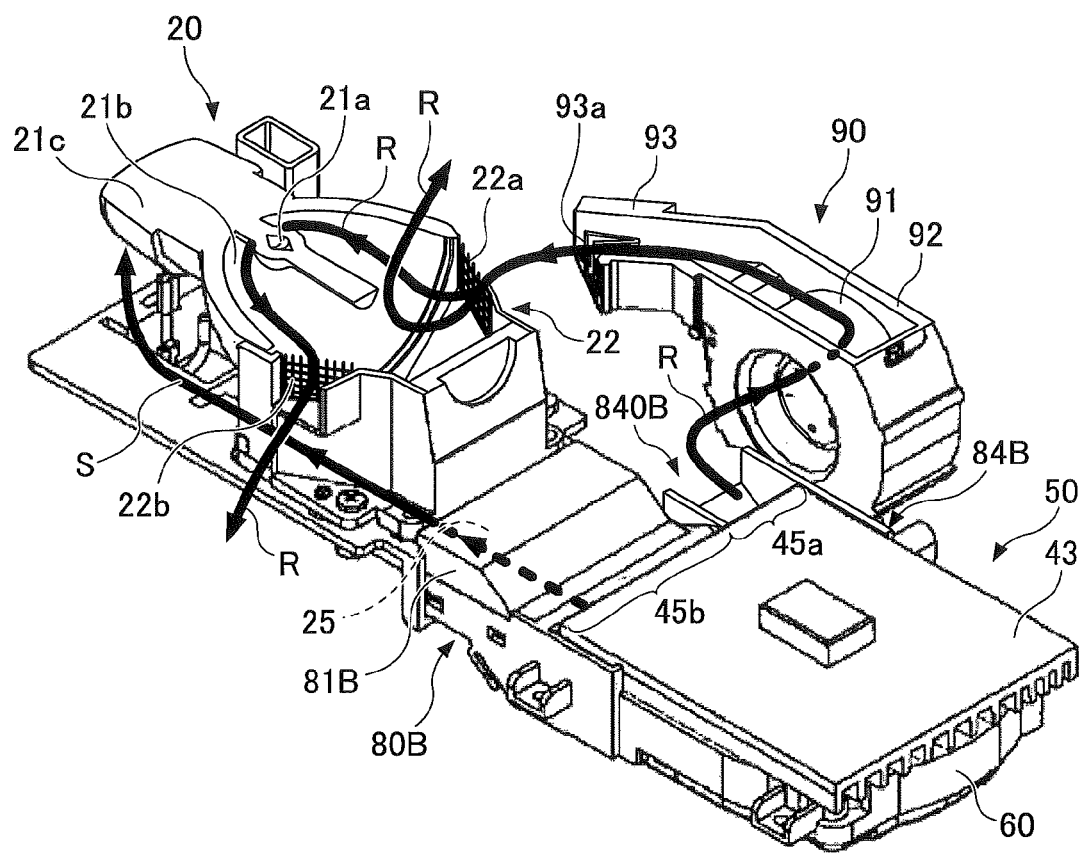
FIG. 29 is a diagram transparently showing a partial cross section of an example of a flowing path of cooling air that is to be flowed into the light source device of the cooling structure according to the sixth embodiment.

Next, there are explained distribution channels for guiding the cooling air to the light source device 20 in the cooling structure according to the sixth embodiment, while considering the differences from the first to fourth embodiments. FIG. 29 is a diagram that transparently showing a partial cross section that shows the distribution channels of the cooling air that is to be flowed into the light source device 20 of the cooling structure according to the sixth embodiment. The connecting duct 80 that is explained by the above-described first to fourth embodiment has a configuration such that the entire cooling air that is exhausted from the sirocco fan 60 is flowed into the duct 25 of the light source device 20 through the flow channel 81, and thereby the light source device 20 is cooled. Namely, the cooling air that passes through the first heat dissipation area 45a and the cooling air that passes through the second heat dissipation area 45b are eventually sent to the duct 25.

In the cooling structure according to the sixth embodiment, the cooling air that passes through the second heat dissipation area 45b is to be flowed into the duct 25 of the light source device 20 through the flow channel 81B, similar to the first to fourth embodiments. However, the cooling air that passes through the first heat dissipation area 45a is guided by the guiding unit 840B of the connecting duct 80B, and the guided cooling air is suctioned inside the light cooling duct 90, and the suctioned cooling air is caused to be flowed into the light source inlet port 22a of the light source housing 22 of the light source device 20. The cooling air that is flowed into the light source device 20 passes through inside the light source device 20, and the cooling air is exhausted from the light source exhaust ports 22b that are provided at the opposite side of the light source inlet port 22a and at the upper surface side of the light source inlet port 22a, respectively. Here, the cooling air is flowed into the light source exhaust port 22b that is provided at the upper surface side of the light source inlet port 22a, because of suction force of a fan that is provided at an upward position of the light source device 20.

Namely, in the cooling structure according to the sixth embodiment, the cooling air that passes through the first heat dissipation area 45a and the cooling air that passes through the second heat dissipation area 45b are guided to different positions, respectively. Basically, the cooling air (the arrow S) that passes through the second heat dissipation area 45b and that is sent to the duct 25 passes through a lower position of the light source housing 22, and the cooling air is guided to outer peripheral surfaces of the reflector 21b and the sealing portion 21c of the light source device 20. Thus, the cooling air can be used for cooling the light source device 20 from outside.

However, the cooling air (the arrow R) that passes through the first heat dissipation area 45a is sent to the light source inlet port 22a of the light source housing 22 through the light cooling duct 90. Then, the cooling air passes through an inner surface of the reflector 21b, the cooling air touches the light source 21a, and the cooling air is sent to the light source exhaust port 22b. Thus, the cooling air R can be used for directly cooling the light source 21a of the light source device 20.

The temperature of the cooling air that passes through the first heat dissipation area 45a and that is suctioned into the light cooling duct 90 can be approximately 60° C., in view of the rated temperature of the heat sink 43. The cooling air that passes through the first heat dissipation area 45a can be sufficiently used for cooling the light source 21b because the temperature of the light source 21b is greater than 1000° C.

Note that, due to the function of the sirocco fan 91 that is for suctioning the cooling air that passes through the first heat dissipation area 45a and for sending the suctioned cooling air (a so-called "push-pull function"), the wind speed of the cooling air that passes through the first heat dissipation area 45a can be significantly greater than the wind speed of the cooling air in the cooling structure according to any one of the first to fourth embodiments. Thus, according to the sixth embodiment, the capability of cooling the heat sink 43 can be significantly enhanced compared to the cooling structure according to any one of the first to fourth embodiments.

As described above, the cooling structure according to the sixth embodiment has a configuration such that the cooling air that passes through the first heat dissipation area 45a and the cooling air that passes through the second heat dissipation area 45b are guided to different positions, respectively. In particular, the cooling air that passes through the first heat dissipation area 45a can be directly sent to the light source 21a that generates heat of the light source 20. Thus, the light source device 20 can be effectively and efficiently cooled compared to a cooling method according to related art.

Modified Example

In the above-described cooling device according to any one of the first to fourth embodiments, the heat sink 43 has a configuration such that the heat sink 43 is integrated with the sirocco fan 60 by providing the step portion 46. However, the cooling device may be a cooling device 50' having the configuration that is described below.

Figure 30:
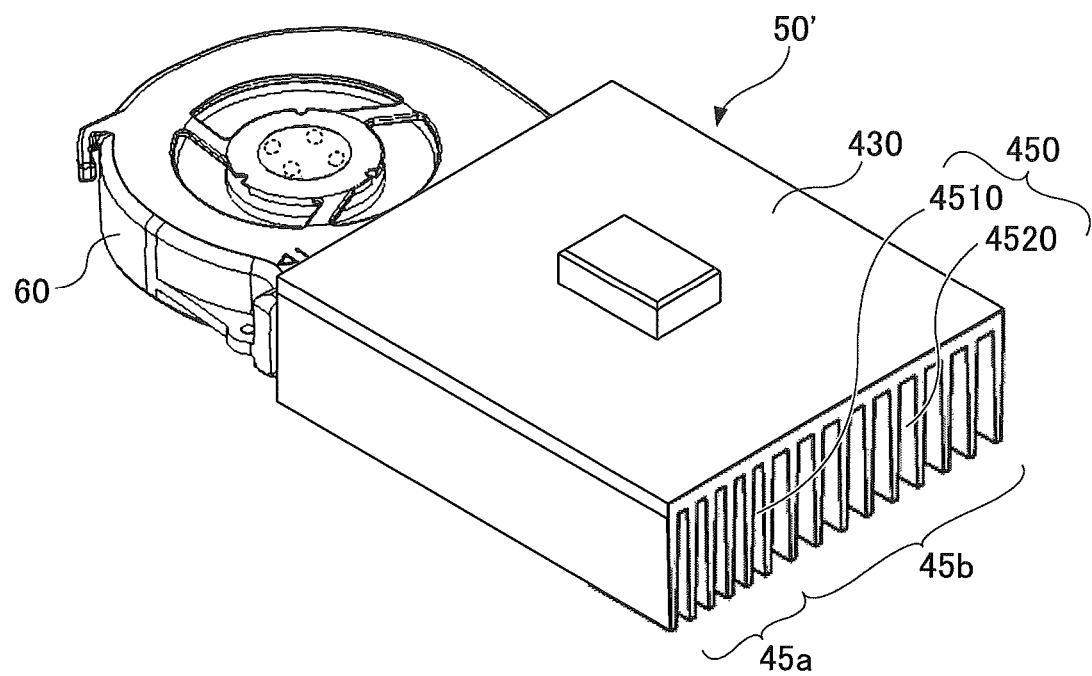
FIG. 30 is an overall perspective view showing a modified example of the cooling device according to the first example.

Namely, the heat sink that is included in the cooling device is not limited to the above-described configuration. For example, as shown in FIG. 30, the heat sink can be a heat sink 430 that is formed to have a complete cube shape without including the step portion. Additionally, the shapes and lengths of the fins 450 that has the first heat dissipation area 45a and the second heat dissipation area 45b can be implemented similar to those of explained in the first to fourth embodiments. In the depicted example, the shapes of the fins 45 that are explained in the first embodiment are merely shown as an example.

In this modified example, the side edges of the upper surface of the heat sink 430 are linearly aligned, and the shape of the upper surface is a rectangular shape. The corners can be rounded, if desired.

Further, as for a sirocco fan, the sirocco fan 60 according to any one of the first to fourth embodiments can be implemented. The sirocco fan can be connected to the heat sink 430 by a connecting member (not shown), thereby forming the cooling device 50'.

In the modified example, the heat sink 430 itself has the complete cube shape. Thus, the heat sink 430 can be embedded into various types of electronic devices or places without changing the design of peripheral members of the heat sink 430. Namely, the heat sink 430 can be used in the various types of the electronic devices or in the places, and the heat sink 430 has high versatility.

The cooling device, the cooling structure, the image projection device, and the electronic device are explained above by the embodiments. However, the present invention is not limited to the embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict).

The present application is based on and claims the benefit of priority of Japanese Priority Application No. 2014-171694 filed on Aug. 26, 2014, the entire contents of which are hereby incorporated herein by reference.

What is claimed is:

1. A cooling device comprising:
an air blowing part that includes an exhaust port; and
a radiator that includes a plurality of heat radiation fins,
wherein the heat radiation fins of the radiator include at least a first heat dissipation area and a second heat dissipation area,
wherein a first surface area of a first set of the heat radiation fins that are disposed in the first heat dissipation area is greater than a second surface area of a second set of the heat radiation fins that are disposed in the second heat dissipation area,
wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, and
wherein the first heat dissipation area including the first set of the heat radiation fins is disposed in the first exhaust area, and the second heat dissipation area including the second set of the heat radiation fins is disposed in the second exhaust area.

2. The cooling device according to claim 1,
wherein a second pitch of the second set of the heat radiation fins that are disposed in the second heat dissipation area is greater than a first pitch of the first set of the heat radiation fins that are disposed in the first heat dissipation area.

3. The cooling device according to claim 1,
wherein a second length of a radiation fin of the second set of the heat radiation fins that are disposed in the second heat dissipation area is less than a first length of a radiation fin of the first set of the heat radiation fins that are disposed in the first heat dissipation area.

4. The cooling device according to claim 1, wherein a longitudinal section of a heat radiation fin of the second set of the heat radiation fins that are disposed in the second heat dissipation area is formed to have a shape that is narrowed downward.

5. The cooling device according to claim 1, wherein a second height of a heat radiation fin of the second set of the heat radiation fins that are disposed in the second heat dissipation area is less than a first height of a heat radiation fin of the first set of the heat radiation fins that are disposed in the first heat dissipation area.

6. A cooling structure comprising:
a radiator that includes a plurality of heat radiation fins, wherein the radiator is configured to dissipate heat from a first object to be cooled by contacting the first object to be cooled; and
an air blowing part for blowing cooling air to the radiator, wherein the air blowing part includes an exhaust port,
wherein the heat radiation fins of the radiator include at least a first heat dissipation area and a second heat dissipation area,
wherein a first surface area of a first set of the heat radiation fins that are disposed in the first heat dissipation area is greater than a second surface area of a second set of the heat radiation fins that are disposed in the second heat dissipation area,
wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area,
wherein the first heat dissipation area including the first set of the heat radiation fins is disposed in the first exhaust area, and the second heat dissipation area including the second set of the heat radiation fins is disposed in the second exhaust area, and
wherein a second object to be cooled that is different from the first object to be cooled is disposed at a downstream side of the second heat dissipation area, and the second cooling air that passes through the second exhaust area is sent to the second object to be cooled.

7. The cooling structure according to claim 6, wherein, in the first heat dissipation area including the first set of the heat radiation fins, the first object to be cooled that is contacted by the radiator is cooled by the first cooling air that is sent from the first exhaust area of the air blowing part.

8. The cooling structure according to claim 7, further comprising:
a duct unit that includes a blower for causing the first cooling air to be flowed into inside the second object to be cooled; and
a guide unit for guiding the first cooling air that passes through the first heat dissipation area to the duct unit.

9. An image projection device comprising:
a cooling structure;
an image display element for displaying an image; and
a projection optical unit for projecting the image that is displayed on the image display element,
wherein the cooling structure includes
a radiator that includes a plurality of heat radiation fins, wherein the radiator is configured to dissipate heat from the image display element by contacting the image display element; and
an air blowing part for blowing cooling air to the radiator, wherein the air blowing part includes an exhaust port,
wherein the heat radiation fins of the radiator include at least a first heat dissipation area and a second heat dissipation area,
wherein a first surface area of a first set of the heat radiation fins that are disposed in the first heat dissipation area is greater than a second surface area of a second set of the heat radiation fins that are disposed in the second heat dissipation area,
wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area,
wherein the first heat dissipation area including the first set of the heat radiation fins is disposed in the first exhaust area, and the second heat dissipation area including the second set of the heat radiation fins is disposed in the second exhaust area, and
wherein the projection optical unit is disposed at a downstream side of the second heat dissipation area, and the second cooling air that passes through the second exhaust area is sent to the projection optical unit.

10. An electronic device comprising;
an object to be cooled; and
a cooling device for cooling the object to be cooled,
wherein the cooling device includes
an air blowing part that includes an exhaust port; and
a radiator that includes a plurality of heat radiation fins,
wherein the heat radiation fins of the radiator include at least a first heat dissipation area and a second heat dissipation area,
wherein a first surface area of a first set of the heat radiation fins that are disposed in the first heat dissipation area is greater than a second surface area of a second set of the heat radiation fins that are disposed in the second heat dissipation area,
wherein the exhaust port of the air blowing part includes a first exhaust area for exhausting first cooling air, and a second exhaust area for exhausting second cooling air, wherein an amount of the second cooling air that is exhausted from the second exhaust area is greater than an amount of the first cooling air that is exhausted from the first exhaust area, and
wherein the first heat dissipation area including the first set of the heat radiation fins is disposed in the first exhaust area, and the second heat dissipation area including the second set of the heat radiation fins is disposed in the second exhaust area.

* * * * *